US008063607B2

(12) United States Patent
Crawford et al.

(10) Patent No.: US 8,063,607 B2
(45) Date of Patent: Nov. 22, 2011

(54) ENERGY STORAGE SYSTEM AND METHOD OF SEQUENTIALLY CHARGING A FIRST AND SECOND BATTERY CELL BASED ON VOLTAGE POTENTIAL

(75) Inventors: John D Crawford, Avon, OH (US); Peter F Hoffman, Avon, OH (US); David A Spartano, Brunswick, OH (US); Frank F Huang, Lakewood, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 395 days.

(21) Appl. No.: 12/277,367

(22) Filed: Nov. 25, 2008

(65) Prior Publication Data

US 2009/0189566 A1 Jul. 30, 2009

Related U.S. Application Data

(60) Provisional application No. 61/023,632, filed on Jan. 25, 2008.

(51) Int. Cl.
*H02J 7/00* (2006.01)

(52) U.S. Cl. .......................................................... 320/124

(58) Field of Classification Search ................... 320/124
See application file for complete search history.

(56) References Cited

U.S. PATENT DOCUMENTS 4,849,682 A * 7/1989 Bauer et al. ................... 320/106
5,057,762 A 10/1991 Goedken et al.
5,229,705 A * 7/1993 Kato ............................ 320/148
5,243,269 A * 9/1993 Katayama et al. ............ 320/126
5,391,973 A 2/1995 Tomazic
5,539,297 A 7/1996 Fiebig
5,561,360 A 10/1996 Ayres et al.
5,729,117 A * 3/1998 Fukuda ........................ 320/117
5,850,136 A 12/1998 Kaneko
5,900,716 A 5/1999 Collar et al.
5,955,867 A * 9/1999 Cummings et al. ........... 320/107
6,031,359 A 2/2000 Michelsen et al.
6,191,560 B1 2/2001 Sakakibara
6,204,633 B1 * 3/2001 Kitagawa ...................... 320/128
D443,584 S * 6/2001 Breyton ....................... D13/103
6,445,164 B2 * 9/2002 Kitagawa ...................... 320/134
6,624,613 B2 * 9/2003 Kitagawa ...................... 320/124
6,707,271 B2 * 3/2004 Kitagawa ...................... 320/134
D489,679 S * 5/2004 Wong ........................... D13/103
6,825,638 B2 11/2004 Kim
6,841,971 B1 1/2005 Spee et al.
7,193,393 B1 3/2007 Payne (Continued)

*Primary Examiner* — Edward Tso
*Assistant Examiner* — Manuel Hernandez
(74) *Attorney, Agent, or Firm* — Michael C. Pophal

(57) ABSTRACT

A lighting system is provided that includes at least one lighting device, at least one connector, and a plurality of external power sources. The external power sources are adapted to be electrically connected to the lighting device by the connector. One of the external power sources is an energy storage system having a plurality of battery cells. A first charging method is utilized when a voltage potential of first and second battery cells is less than a voltage potential threshold, a second charging method is utilized when the voltage potential of the first and second battery cells is equal to or greater than the voltage potential threshold, and the first charging method is utilized to charge the first battery cell prior to charging the second battery cell when the first battery cell voltage potential is below the voltage potential threshold and greater than the second battery cell voltage potential.

28 Claims, 30 Drawing Sheets

U.S. PATENT DOCUMENTS

| | | | | |
|---|---|---|---|---|
| 7,253,586 | B2 | 8/2007 | Kangas et al. | |
| 7,279,867 | B2 | 10/2007 | Benckenstein, Jr. et al. | |
| 7,554,292 | B2 * | 6/2009 | Veselic | 320/116 |
| 2005/0046386 | A1 * | 3/2005 | Nishida et al. | 320/116 |

* cited by examiner

FIG. 12A
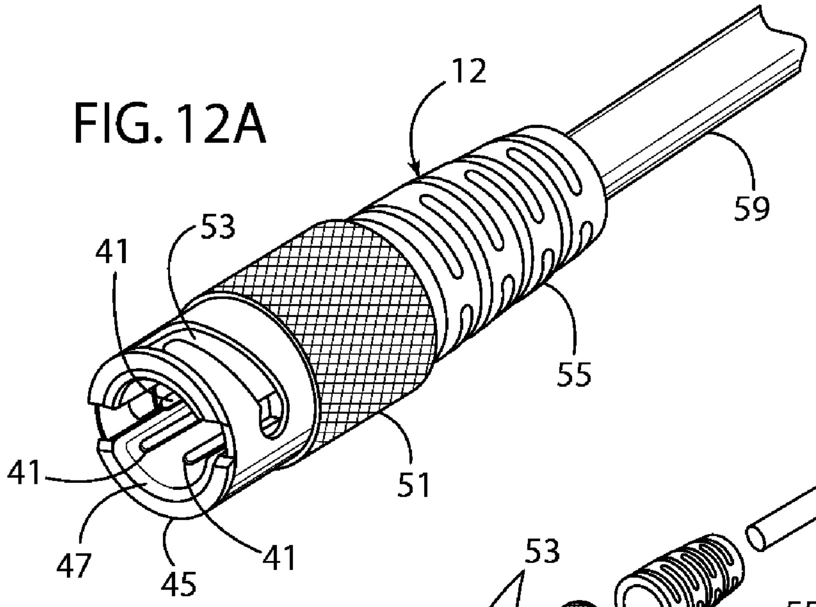
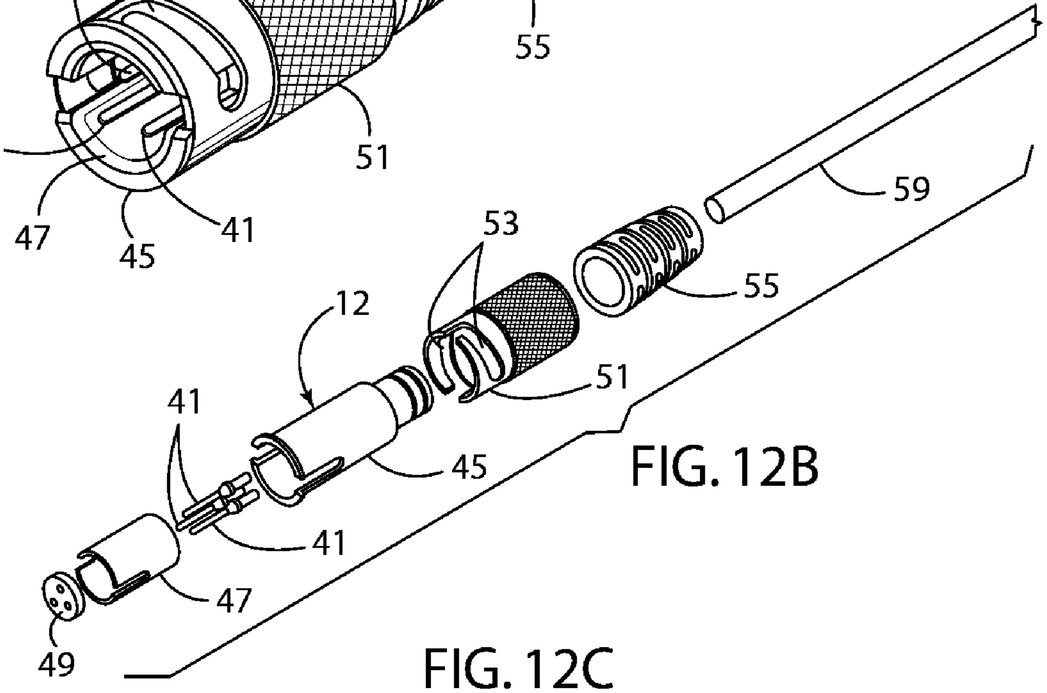
FIG. 12B
FIG. 12C
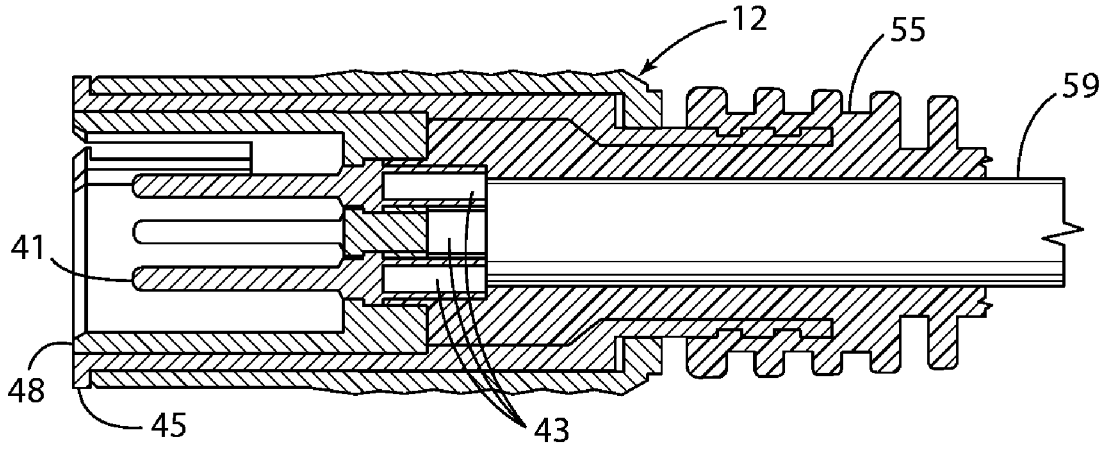

ENERGY STORAGE SYSTEM AND METHOD OF SEQUENTIALLY CHARGING A FIRST AND SECOND BATTERY CELL BASED ON VOLTAGE POTENTIAL

CROSS-REFERENCE TO RELATED APPLICATIONS

This application claims the benefit under 35 U.S.C. §119 (e) of U.S. Provisional Patent Application No. 61/023,632, filed on Jan. 25, 2008, the entire disclosure of which is hereby incorporated herein by reference.

FIELD OF THE INVENTION

The present invention generally relates to an energy storage system and method of charging, and more particularly, to an energy storage system having a plurality of battery cells and a method of charging the plurality of battery cells.

BACKGROUND OF THE INVENTION

Generally, a mobile lighting device, such as a flashlight, is powered by a power source that is internal to the flashlight, such as a battery. Typically, the batteries of the flashlight device can be replaced when the state of charge of the batteries is below an adequate state of charge for providing electrical power for the light source of the flashlight. Since the flashlight is being powered by batteries, the flashlight can generally emit light while not being electrically connected to a power source that is external to the flashlight, such as an alternating current (AC) wall outlet.

Additionally, when the batteries of the flashlight have a state of charge that is below an adequate state of charge level, the batteries can be replaced with other batteries. If the removed batteries are rechargeable batteries, then the removed batteries can be recharged using an external recharging device, and re-inserted into the flashlight. When the removed batteries are not rechargeable batteries, then the non-rechargeable batteries are replaced with new batteries.

Alternatively, a flashlight may contain an electrical connector in order to connect to a specific type of power source, such as the AC wall outlet, in addition to the batteries. Typically, when the flashlight is connected to the stationary external power supply, the flashlight can continue to illuminate light, but the mobility of the flashlight is now hindered. If the flashlight is directly connected to the AC wall outlet, then the mobility of the flashlight is generally eliminated. When the flashlight is not directly connected to the AC wall outlet, such as by an extension cord, the flashlight has limited mobility.

SUMMARY OF THE INVENTION

In accordance with one aspect of the present invention, an energy storage system is provided that includes a plurality of battery cells and a controller. The plurality of battery cells include a first battery cell and a second battery cell. The controller is in communication with the first and second battery cells, which controls an electrical current supplied to the first and second battery cells. The controller controls the electrical current such that a first charging method is utilized when a voltage potential of the first and second battery cells is less than a first voltage potential threshold, respectively, a second charging method is utilized when the voltage potential of the first and second battery cells is equal to or greater than the first voltage potential threshold, wherein the first charging method charges at least one of the first and second battery cells at a quicker rate than said second charging method. The controller further utilizes the first charging method to charge the first battery cell to the second battery cell when the voltage potential of the first battery cell is below the first voltage potential threshold.

In accordance with another aspect of the present invention, an energy storage system is provided that includes a plurality of battery cells and a controller. The plurality of battery cells are configured to be electrically connected to a power source, and include a first battery cell and a second battery cell. The controller is in communication with the first and second battery cells, and controls an electrical current supplied to the first and second battery cells, such that a substantially constant electrical current is supplied to the first and second battery cells for a period of time when a voltage potential of the first and second battery cells is less than a first voltage potential threshold, respectively, and an electrical current at a substantially constant voltage potential is supplied to the first and second battery cells when the voltage potential of the first and second battery cells is equal to or greater than the first voltage potential threshold. The controller further controls the substantially constant electrical current to the first battery cell prior to an electrical current being supplied to the second battery cell, wherein the voltage potential of the first battery cell is below the first voltage potential threshold, and the voltage potential of the first battery cell is greater than the voltage potential of the second battery cell.

In accordance with yet another aspect of the present invention, a method of charging a plurality of battery cells in an energy storage system is provided that includes the step of charging one of a first and second battery cells utilizing a first charging method when the first and second battery cells have a voltage potential less than a first voltage potential threshold. The method further includes the steps of charging one of the first and second battery cells utilizing a second charging method when the first battery cell has a voltage potential of equal to or greater than the first voltage potential threshold, and charging the first battery cell utilizing the first charging method prior to charging the second battery cell when the voltage potential of the first battery cell is below the first voltage potential threshold.

In accordance with another aspect of the present invention, a method charging a plurality of battery cells in an energy storage system is provided that includes the step of charging one of a first battery cell and a second battery cell by supplying a substantially constant electrical current when at least one of the first and second battery cells have a voltage potential less than a first voltage potential threshold. The method further includes the steps of charging one of the first and second battery cells by supplying an electrical current at a substantially constant voltage potential when the first and second battery cells have a voltage potential equal to or greater than the first voltage potential, and charging the first battery cell by supplying the substantially constant electrical current prior to charging the second battery cell when the voltage potential of the first battery cell is below the first voltage potential threshold, and when the voltage potential of the first battery cell is greater than the voltage potential of the second battery cell.

These and other features, advantages, and objects of the present invention will be further understood and appreciated by those skilled in the art by reference to the following specification, claims, and appended drawings.

BRIEF DESCRIPTION OF THE DRAWINGS

The present invention will now be described, by way of example, with reference to the accompanying drawings, in which:

FIG. 12A is a front perspective view of an electrical connector of a lighting system, in accordance with one embodiment of the present invention;

FIG. 12B is an exploded view of the electrical connector of the lighting system, in accordance with one embodiment of the present invention;

FIG. 12C is a cross-sectional view of the electrical connector of the lighting system, in accordance with one embodiment of the present invention;

DETAILED DESCRIPTION OF PREFERRED EMBODIMENTS

Figure 1:
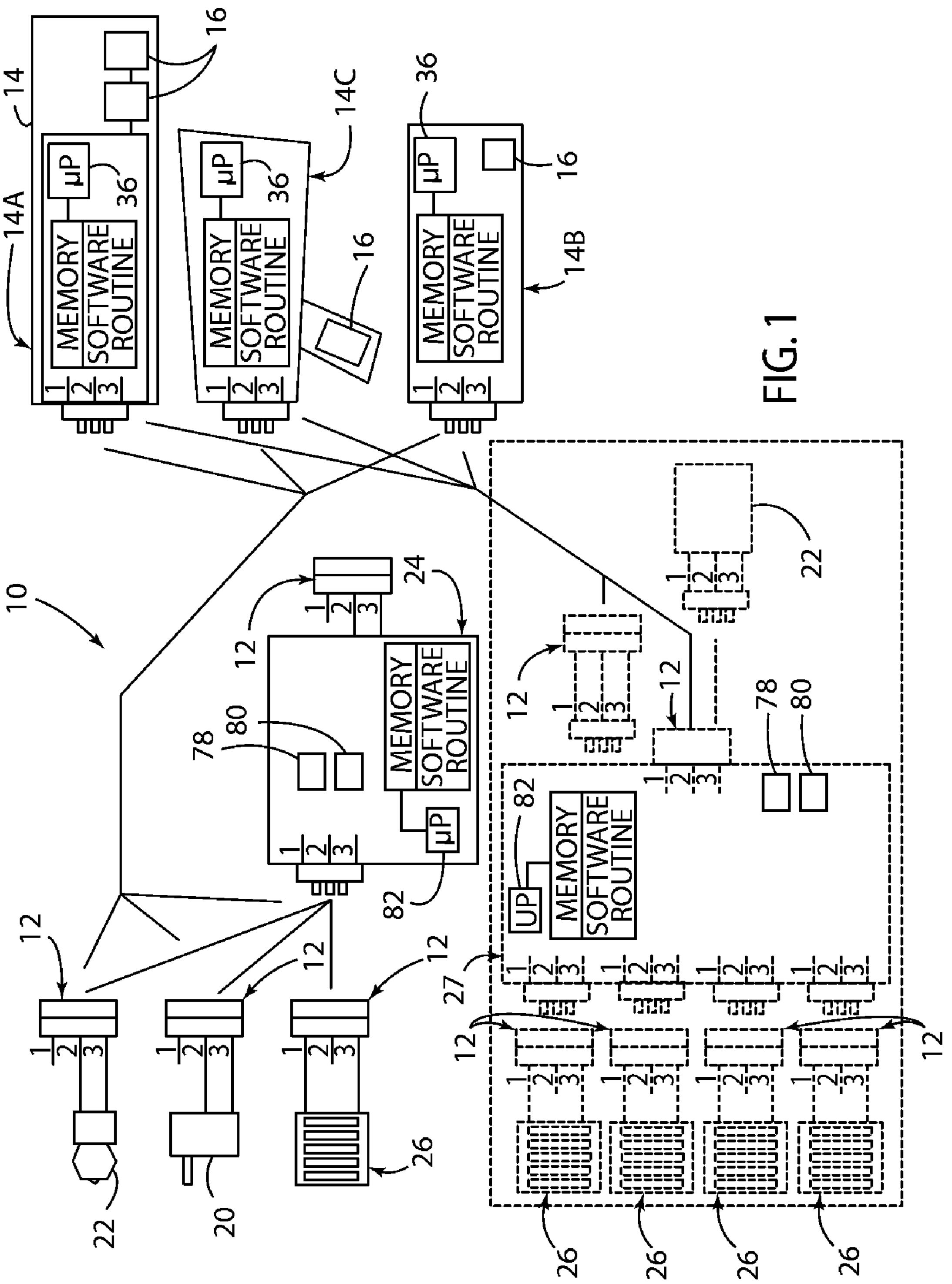
FIG. 1 is a schematic view of a lighting system having a plurality of lighting devices and a plurality of external power sources, in accordance with one embodiment of the present invention.

Before describing in detail embodiments that are in accordance with the present invention, it should be observed that the embodiments include combinations of method steps and apparatus components related to a lighting system and method of operating thereof. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like reference characters in the description and drawings represent like elements.

In this document, relational terms, such as first and second, top and bottom, and the like, may be used to distinguish one entity or action from another entity or action, without necessarily requiring or implying any actual such relationship or order between such entities or actions. The terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by “comprises . . . a” does not, without more constraints, preclude the existence of additional identical elements in the process, method, article, or apparatus that comprises the element.

I. Lighting System

In reference to FIGS. 1-12, a lighting system is generally shown at reference identifier 10. The lighting system 10 includes at least one lighting device 14, at least one electrical connector generally indicated at 12, and one or more power sources 16,20,22,24,26,27. According to one embodiment, the at least one lighting device includes a handheld lighting device generally indicated at 14A, a headlight lighting device generally indicated at 14B, and a spotlight lighting device generally indicated at 14C. For purposes of explanation and not limitation, the invention is generally described herein with regards to the at least one lighting device including the handheld lighting device 14A, the headlight lighting device 14B, and the spotlight lighting device 14C; however, it should be appreciated by those skilled in the art that the lighting system 10 can include a combination of the lighting devices 14A,14B,14C and/or additional lighting devices. The at least one lighting device typically includes at least one lighting source and an internal power source, generally indicated at 16, that supplies a first electrical current to illuminate the at least one lighting source, as described in greater detail herein. However, it should be appreciated by those skilled in the art that other embodiments include devices that emit the at least one lighting device 14A,14B,14C and/or the internal power source 16. According to one embodiment, the lighting system 10 can include non-lighting devices, such as, but not limited to, a weather radio, a global positioning satellite (GPS) system receiver, an audio player, a cellular phone, the like, or a combination thereof.

According to one embodiment, the at least one lighting source includes a white flood light emitting diode (LED) 18A, a white spot LED 18B, and a red flood LED 18C. Typically, the white flood LED 18A and white spot LED 18B emit a white light having two different illumination patterns, wherein the white flood LED 18A illumination pattern disperses the emitted light over a greater area than the white spot LED 18B, as described in greater detail below. It should be appreciated by those skilled in the art that the white flood LED 18A, white spot LED 18B, and red flood LED 18C can be any desirable color, such as, but not limited to, white, red, blue, suitable colors of light in the visible light wavelength spectrum, infrared, suitable colors of light in the non-visible light wavelength spectrum, the like, or a combination thereof.

According to one embodiment, the flood beam pattern illuminates a generally conical shaped beam having a circular cross-section with a target size in diameter of approximately two meters (2 m) or greater at a target distance of approximately one hundred meters (100 m), and the spot beam pattern illuminates a generally conical shaped beam having a circular cross-section with a target size in diameter of approximately less than one meter (1 m) at a target distance of two meters (2 m). Thus, the flood beam pattern can be defined as the light being emitted at a half angle of twelve degrees (12°) or greater with respect to the lighting source 18A, and the spot beam pattern can be defined as the light being emitted at a half angle of less than twelve degrees (12°) with respect to the lighting source 18B. According to one embodiment, the spot lighting source 18B can have a half angle of less than or equal to approximately five degrees (5°) for the handheld and headlight lighting devices 14A,14B, and a half angle of less than or equal to approximately two degrees (2°) for the spotlight lighting device 14C. The red flood LED 18C can have a similar illumination pattern to the white flood LED 18A while emitting a red-colored light. According to one embodiment, the term illumination pattern generally refers to the size and shape of the illuminated area at a target distance, angles of the emitted light, the intensity of the emitted light across the beam, the illuminance of the beam (e.g., the total luminous flux incident on a surface, per unit area), or a combination thereof. The shape of the illumination pattern can be defined as the target area containing approximately eighty percent to eighty-five percent (80%-85%) of the emitted light.

It should be appreciated by those skilled in the art that the flood and/or the spot illumination patterns can form or define shapes other than circles, such as, but not limited to, ovals, squares, rectangles, triangles, symmetric shapes, non-symmetric shapes, the like, or a combination thereof. It should further be appreciated by those skilled in the art that the lighting sources 18A,18B,18C can be other combinations of lighting sources with different illumination patterns, such as, but not limited to, two or more flood lighting sources, two or more spot lighting sources, or a combination thereof.

For purposes of explanation and not limitation, the invention is generally described herein with regards to the at least one lighting source including the white flood LED 18A, the white spot LED 18B, and the red flood LED 18C. However, it should be appreciated by those skilled in the art that the lighting system 10 can include lighting devices 14A,14B,14C having a combination of lighting sources 18A,18B,18C and/or additional lighting sources. According to one embodiment, the light sources 18A,18B,18C are connected to a LED circuit board 19, as described in greater detail below.

The plurality of power sources include a plurality of external power sources, wherein the plurality of external power sources include at least first and second external power sources that are adapted to be electrically connected to the at least one lighting device by the at least one electrical connector 12. Typically, the electrical connector 12 electrically connects the external power source to the lighting device 14A,14B,14C. By way of explanation and not limitation, the plurality of external power sources can include an alternating current (AC), such as a 120 Volt wall outlet, power source 20, a direct current (DC) power source 22, such as an outlet in a vehicle, an energy storage system generally indicated at 24, a solar power source 26, a solar power energy storage system 27, the like, or a combination thereof. It should be appreciated by those skilled in the art that other types of external power sources can be configured to connect with the lighting device 14A,14B,14C.

For purposes of explanation and not limitation, the handheld lighting device 14A can be adapted to be held by a single hand of a user, wherein the hand of the user wraps around the longitudinally extending handheld lighting device 14A. Thus, a thumb of the user's hand is positioned to actuate at least one switch SW1,SW2,SW3, or SW4, which alters the light emitted by the handheld lighting device 14A, as described in greater detail herein. The headlight lighting device 14B can be adapted to be placed over a user's head using a headband 21, wherein the user actuates the at least one switch SW1,SW2,SW3, or SW4 using one or more fingers of the user's hand in order to alter the light emitted from the headlight lighting device 14B, as described in greater detail herein. Thus, a user generally directs the light emitted by the headlight lighting device 14B by moving their head. Additionally or alternatively, the spotlight lighting device 14C is adapted to be held in the hand of a user, wherein the user's hand wraps around a handle portion 17 of the spotlight lighting device 14C. Typically, a user's hand is positioned on the handle portion 17, such that an index finger of the user's hand can actuate switches SW1,SW2, or SW3, and a middle finger of the user's hand can be used to actuate switch SW4, which alters the light emitted by the spotlight lighting device 14C, as described in greater detail herein. Generally, the spotlight lighting device 14C illuminates objects with the light emitted from the lighting source 18B at a greater distance than objects illuminated by light emitted from the handheld lighting device 14A and headlight lighting device 14B.

Typically, the lighting devices 14A,14B,14C include the internal power source 16, and are electrically connected to the external power sources 20,22,24,26, or 27 by the electrical connector 12. The lighting devices 14A,14B,14C can be electrically connected to the external power sources 20,22,24,26, or 27 at the discretion of the user of the lighting system 10, such that the lighting devices 14A,14B,14C are not consuming electrical power from the internal power source 16 when the lighting devices 14A,14B,14C are electrically connected to one of the external power sources 20,22,24,26, or 27. Thus, if a user does not desire to consume the electrical power of the internal power source 16 or the state of charge of the internal power source 16 is below an adequate level, the user can electrically connect one of the external power sources 20,22,24,26, or 27 to the lighting device 14A,14B,14C, such that the electrically connected power source 20,22,24,26, or 27 supplies an electrical current to the lighting source 18A,18B,18C, according to one embodiment. Further, one or more of the external power sources can be a rechargeable power source that can be charged by other external power sources of the lighting system 10, or other power sources external to the lighting system 10.

According to one embodiment, the first external power source supplies a second electrical current to the at least one lighting device to illuminate the at least one lighting source 18,18B,18C, and the second external power source supplies a third electrical current to illuminate the at least one lighting source 18A,18B,18C, such that the internal power source 16 and one of the plurality of external power sources each supply electrical current to illuminate the at least one lighting source 18A,18B,18C at different times, as described in greater detail herein. The first, second, and third electrical currents are supplied at least two different voltage potentials. According to one embodiment, the AC power source 20 receives electrical current from an AC source at a voltage potential ranging from substantially ninety Volts (90 VAC) to two hundred forty Volts (240 VAC) at fifty hertz (50 Hz) or sixty hertz (60 Hz), and supplies an electrical current to the lighting devices 14A,14B,14C at a voltage potential of about substantially 12 Volts, the DC power source 22 supplies the electrical current at a voltage potential of about substantially 12 Volts, the energy storage system 24 and solar power energy storage system 27 supply the electrical current at a voltage potential of about substantially 3.6 Volts, and the solar power source 26 supplies the electrical current at a voltage potential of substantially 8 Volts. According to one embodiment, the internal power source 16 can be an electrochemical cell battery configured as a 1.5 Volt power source, such as, but not limited to, an alkaline battery, a nickel metal hydride (NiMH) battery, or the like. Alternatively, the internal power source 16 can be an electrochemical cell battery configured as a 3.6 Volt-3.7 Volt power source, such as a lithium ion (Li-Ion) battery, or the like. Thus, the lighting devices 14A,14B,14C can be supplied with an electrical current having a voltage potential ranging from and including approximately 1.5 Volts to 12 Volts in order to illuminate the lighting sources 18A,18B,18C.

Figure 2A:
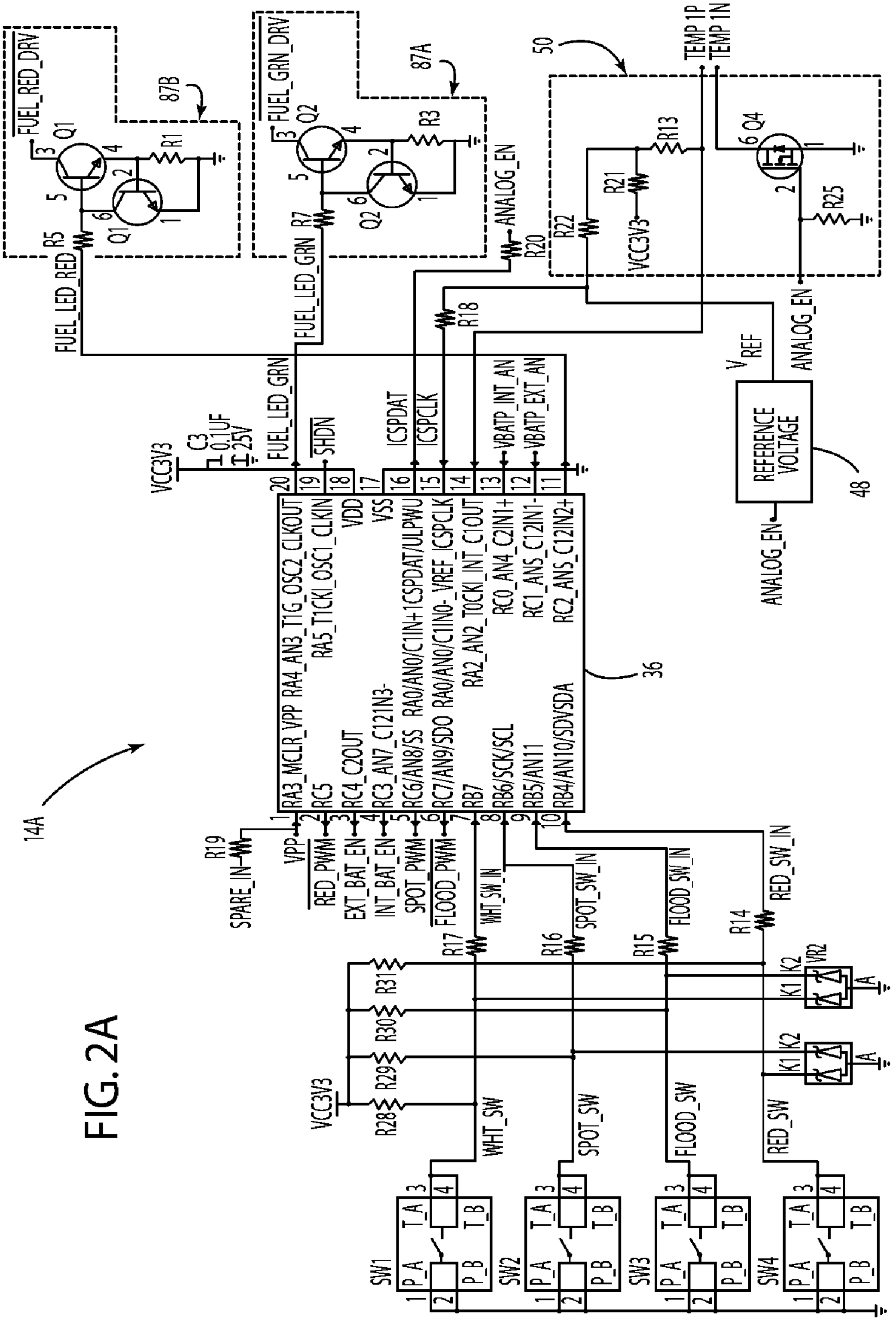
FIG. 2A is a circuit diagram of a handheld lighting device of a lighting system, in accordance with one embodiment of the present invention.
Figure 2B:
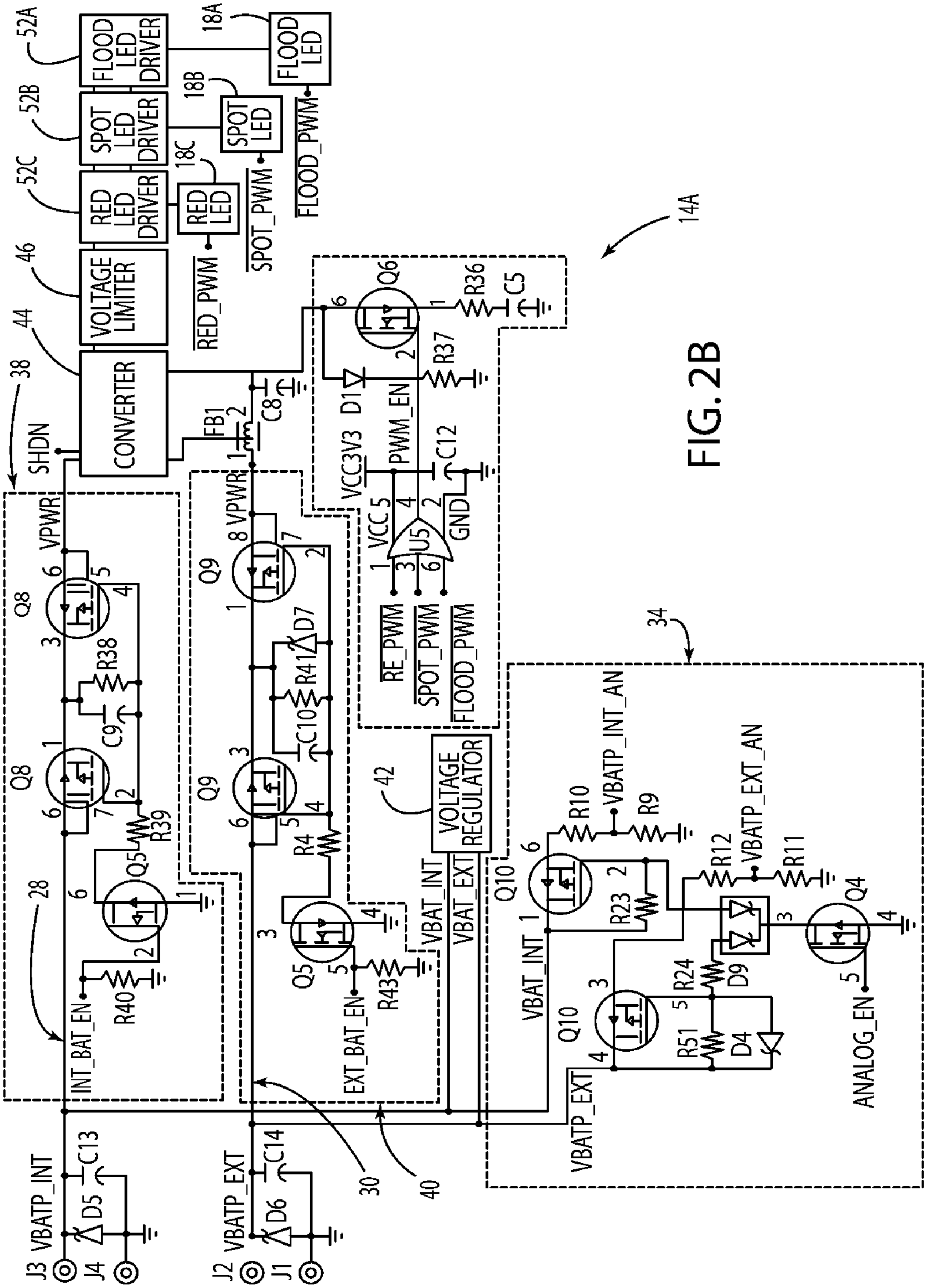
FIG. 2B is a circuit diagram of the handheld lighting device of the lighting system, in accordance with one embodiment of the present invention.
Figure 3A:
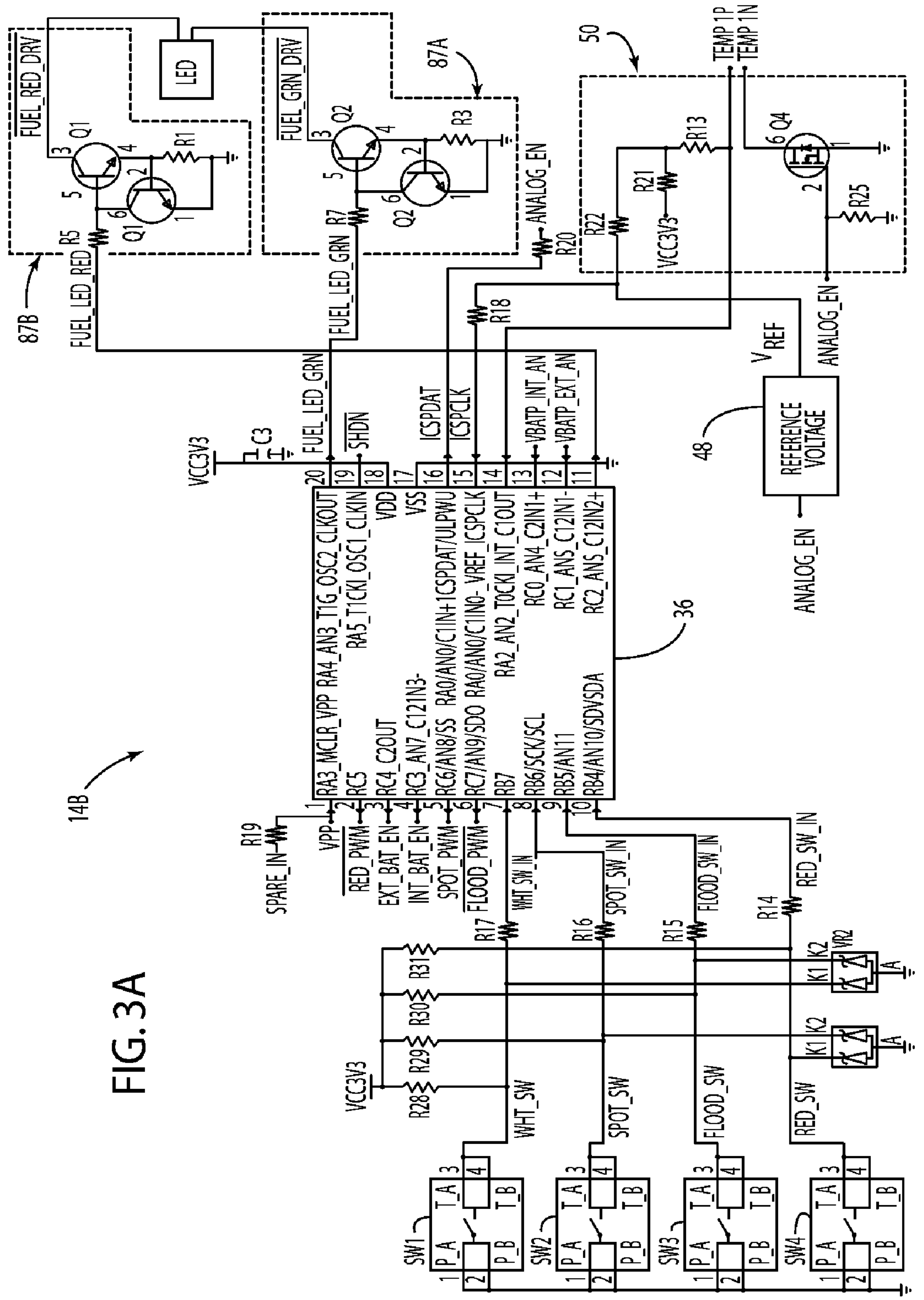
FIG. 3A is a circuit diagram of a headlight lighting device of a lighting system, in accordance with one embodiment of the present invention.
Figure 3B:
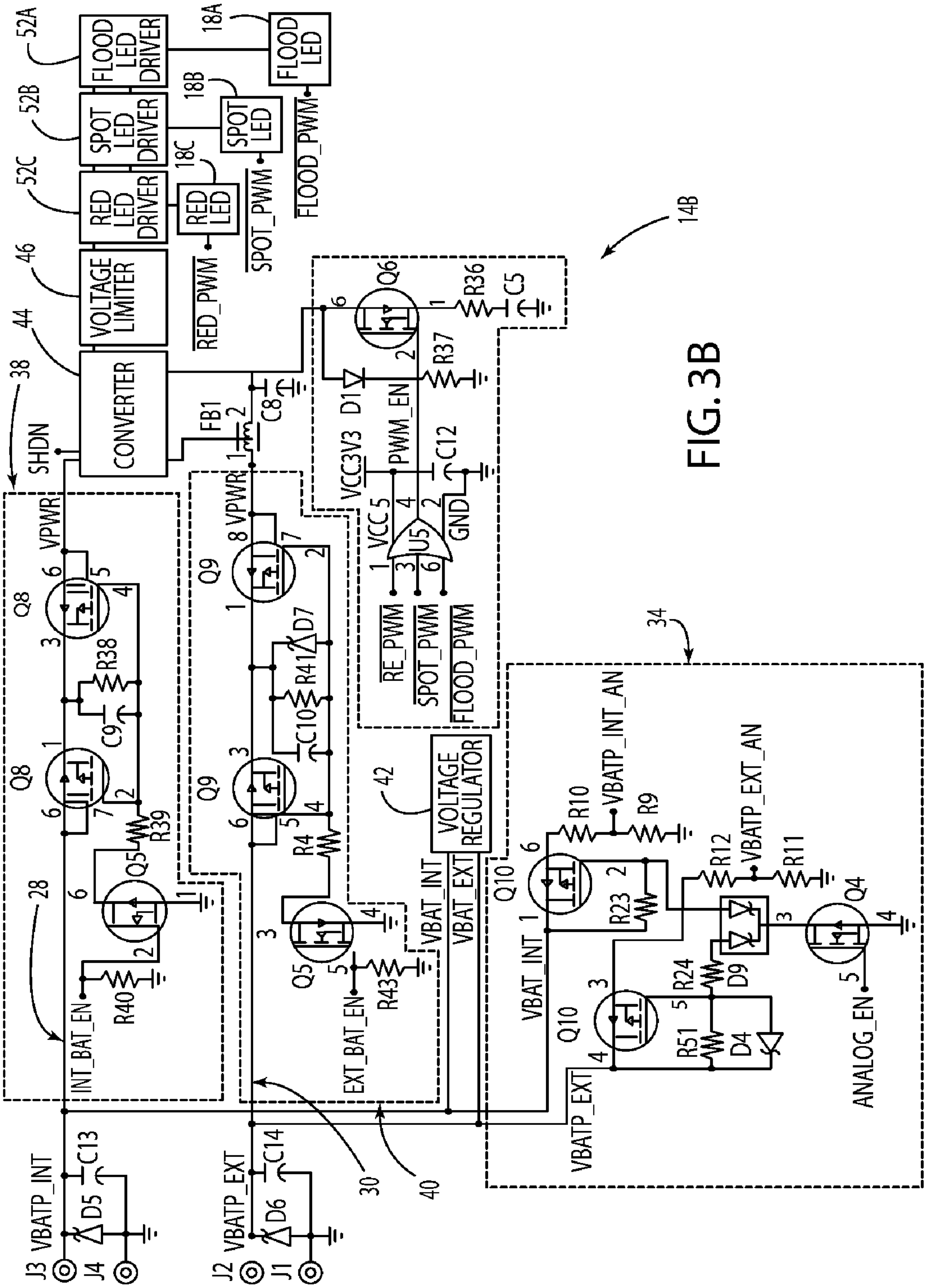
FIG. 3B is a circuit diagram of the headlight lighting device of the lighting system, in accordance with one embodiment of the present invention.
Figure 4A:
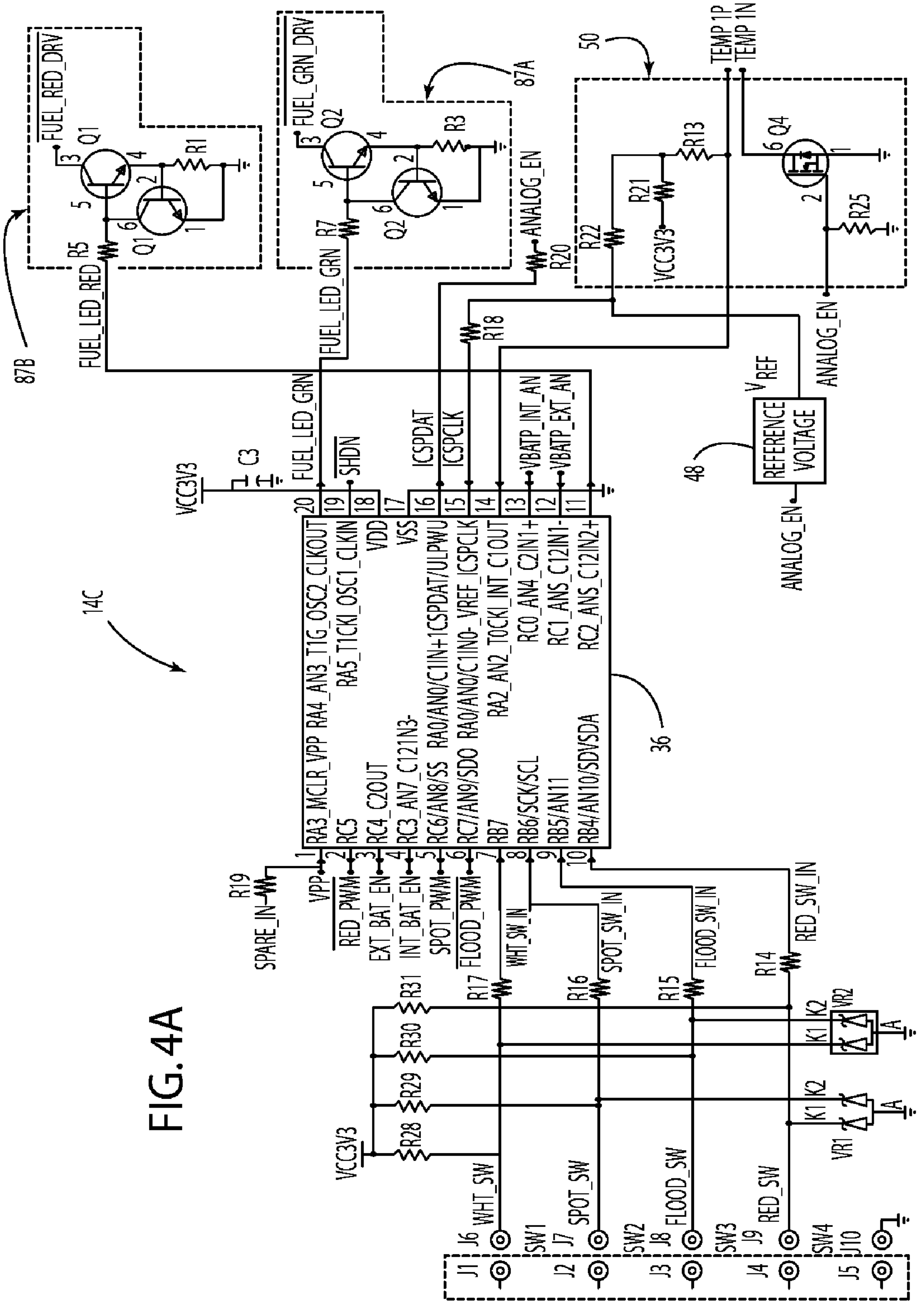
FIG. 4A is a circuit diagram of a spotlight lighting device of a lighting system, in accordance with one embodiment of the present invention.
Figure 4B:
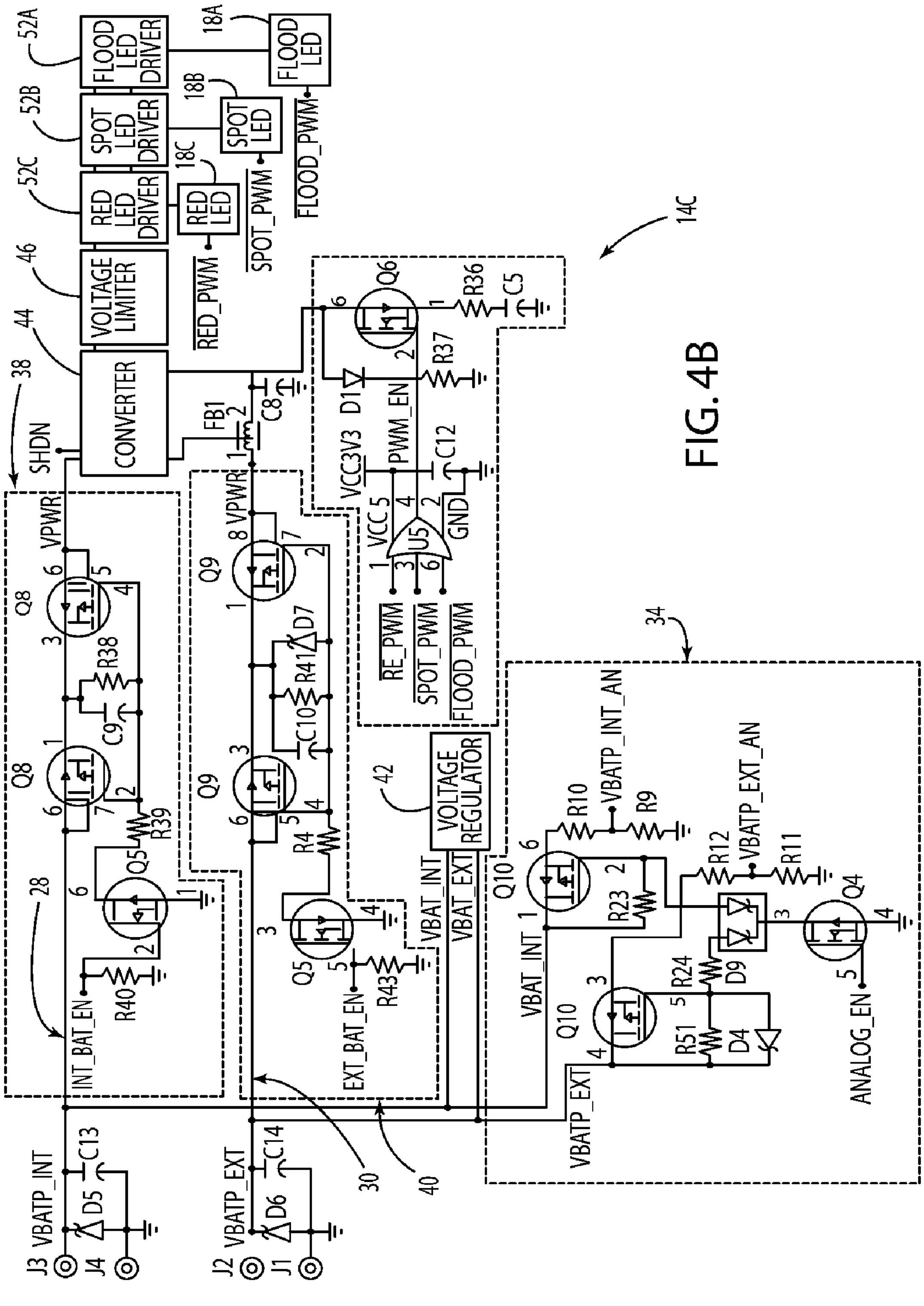
FIG. 4B is a circuit diagram of the spotlight lighting device of the lighting system, in accordance with one embodiment of the present invention.
Figure 5A:
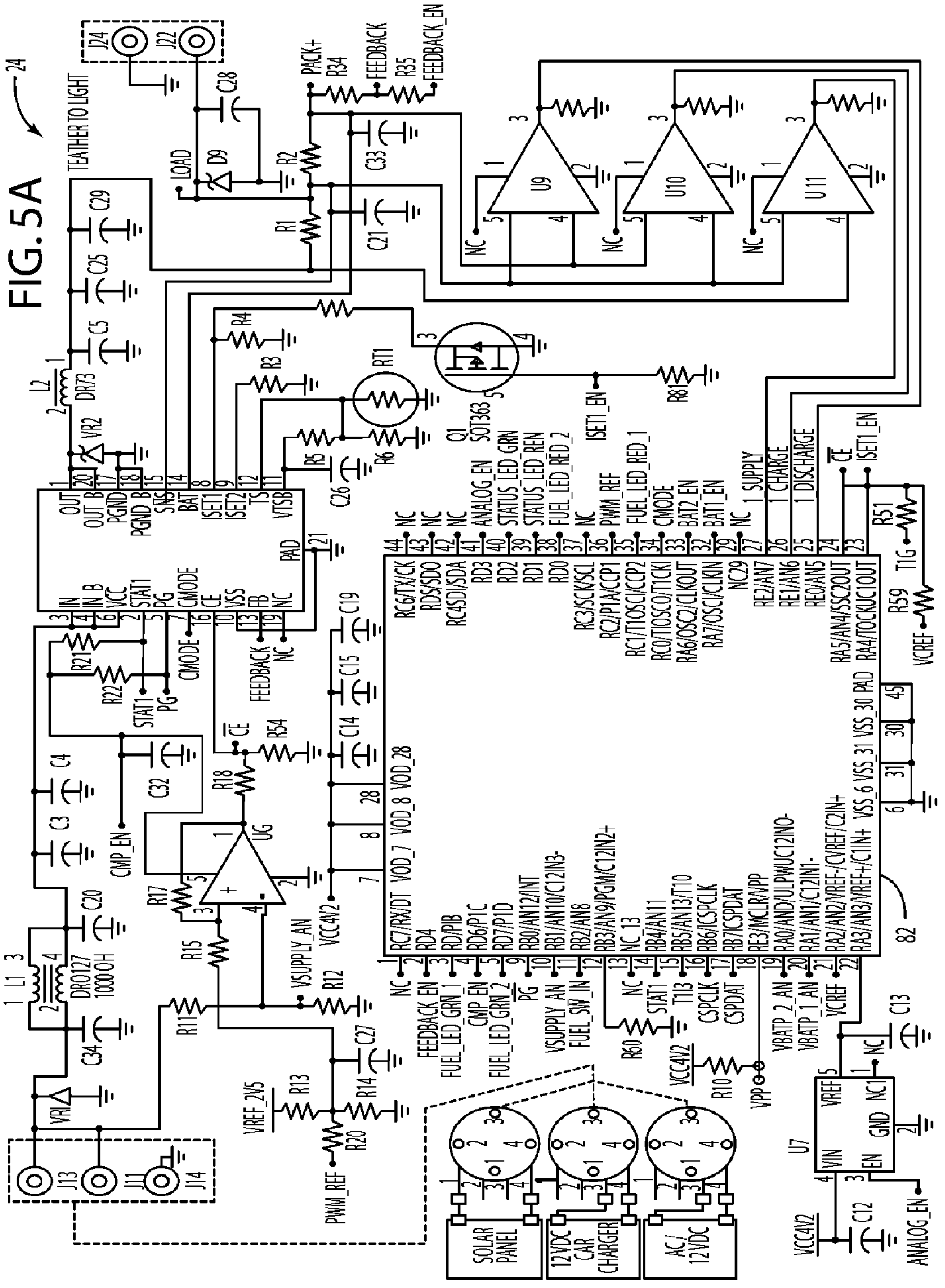
FIG. 5A is a circuit diagram of an energy storage system of a lighting system, in accordance with one embodiment of the present invention.
Figure 5B:
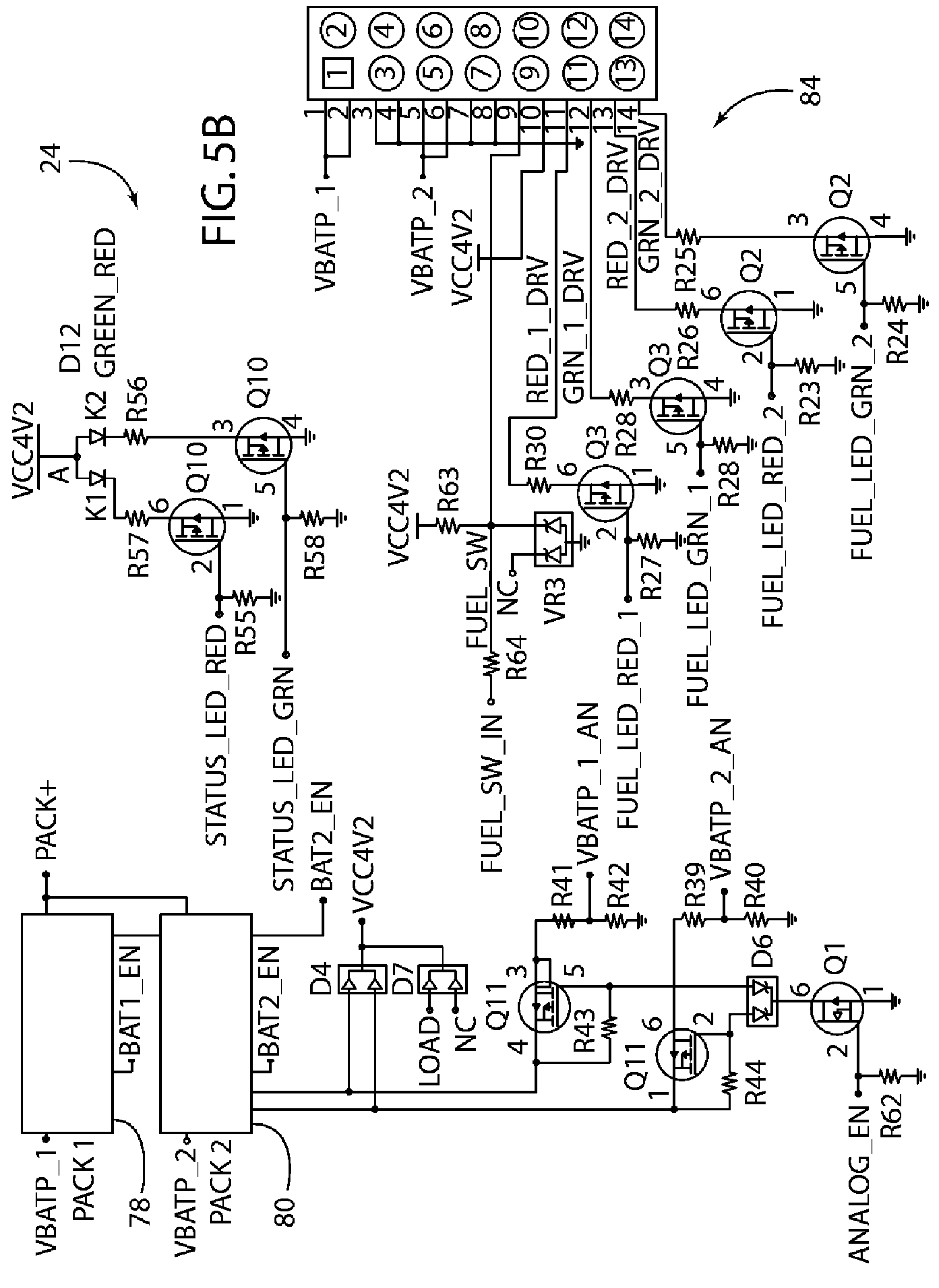
FIG. 5B is a circuit diagram of the energy storage system of the lighting system, in accordance with one embodiment of the present invention.

According to one embodiment, the lighting devices 14A,14B,14C can each include a first electrical path generally indicated at 28, and a second electrical path generally indicated at 30, wherein both the first electrical path 28 and second electrical path 30 are internal to the lighting device 14A,14B,14C (FIGS. 2B, 3B, and 4B). Typically, the internal power source 16 provides the electrical current to the lighting source 18A,18B,18C through the first electrical path 28, and the plurality of external power sources 20,22,24,26,27 supply the electrical current via the electrical connector 12 to the lighting source 18A,18B,18C through the second electrical path 30, such that the second electrical path 30 bypasses the first electrical path 28. According to an alternate embodiment, the external power sources 20,22,24,26,27, when connected to the lighting device 14A,14B,14C, supply the electrical current via the electrical connector 12 through the second electrical path 30 to illuminate the lighting element 18A,18B,18C and supply an electrical current to the internal power source 16 to recharge the internal power source. It should be appreciated by those skilled in the art that in such an embodiment, the internal power source 16 is a rechargeable power source (FIG. 1). According to another embodiment, the lighting device 14A,14B,14C is not configured to be electrically connected to the external power sources 20,22,24,26,27, and thus, is not adapted to be connected to the connector 12.

The lighting devices 14A,14B,14C typically include the internal power source 16 and are configured to connect to one of the external power sources 20,22,24,26, or 27 at a time. A battery voltage monitor generally indicated at 34 is in electrical communication with the internal power source 16 and the external power sources 20,22,24,26,27, when one of the external power sources 20,22,24,26, or 27 is connected. The battery voltage monitor 34 determines if the internal power source 16 and external power source 20,22,24,26,27 have a voltage potential. According to one embodiment, a processor or microprocessor 36 powers or turns on transistors Q10 of the battery voltage monitor 34, so that the lighting device 14A,14B, or 14C can determine if the internal power source 16 or the connected external power source 20,22,24,26, or 27 has a voltage potential. Thus, the battery voltage monitor 34 activates a switch to turn on one of an internal battery selector, generally indicated at 38, or an external battery selector, generally indicated at 40. According to one embodiment, the internal battery selector 38 is turned on by switching transistors Q8, which can be back-to-back field-effect transistors (FETs), and the external battery selector 40 is turned on by switching transistors Q9, which can be back-to-back FETs.

Figure 6:
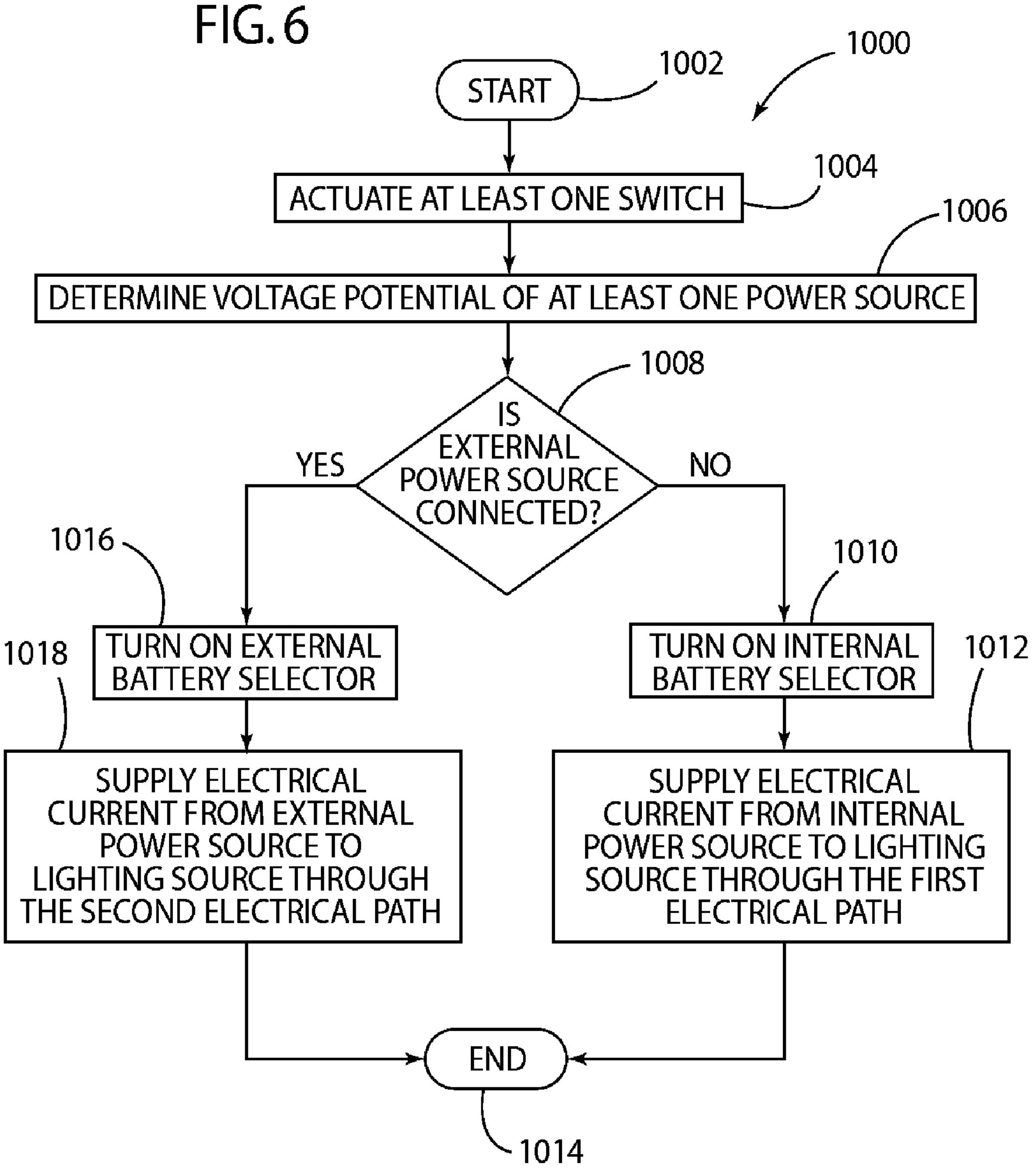
FIG. 6 is a flow chart illustrating a method of an electrical current supported by an external power source bypassing an internal power source of a lighting device of a lighting system, in accordance with one embodiment of the present invention.
Figure 7A:
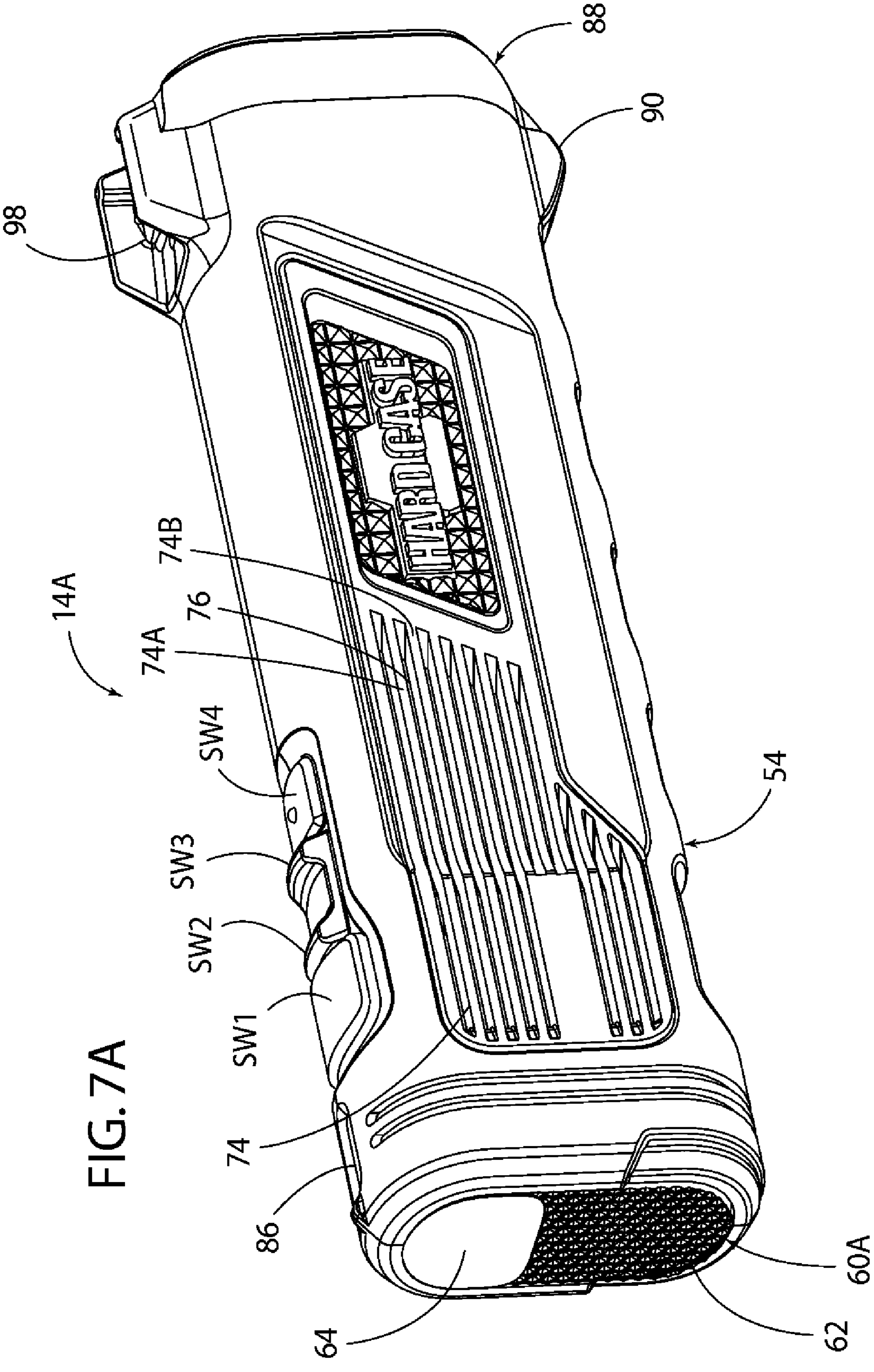
FIG. 7A is front perspective view of a handheld lighting device of a lighting system, in accordance with one embodiment of the present invention.
Figure 7B:
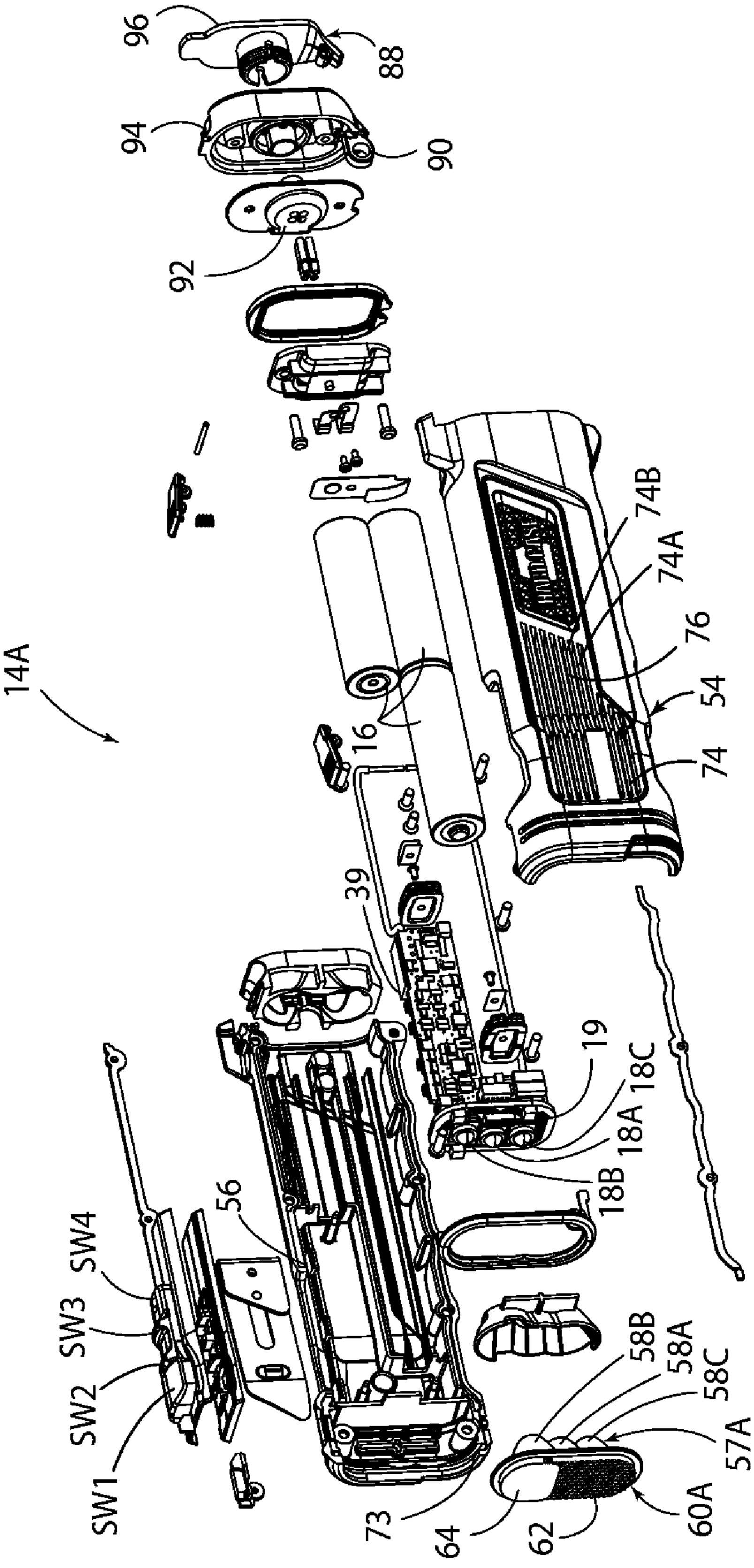
FIG. 7B is an exploded view of the handheld lighting device of the lighting system, in accordance with one embodiment of the present invention.
Figure 7C:
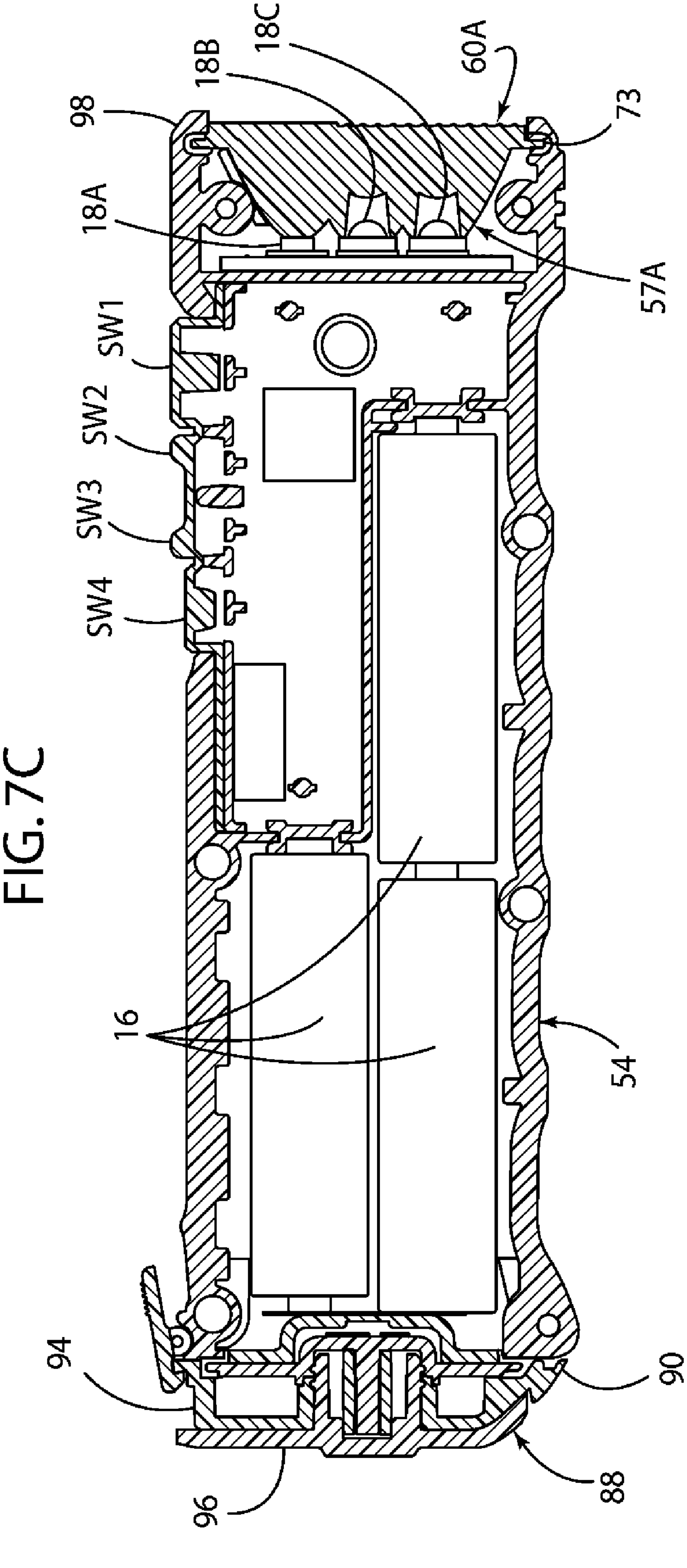
FIG. 7C is a cross-sectional view of the handheld lighting device of the lighting system, in accordance with one embodiment of the present invention.
Figure 7D:
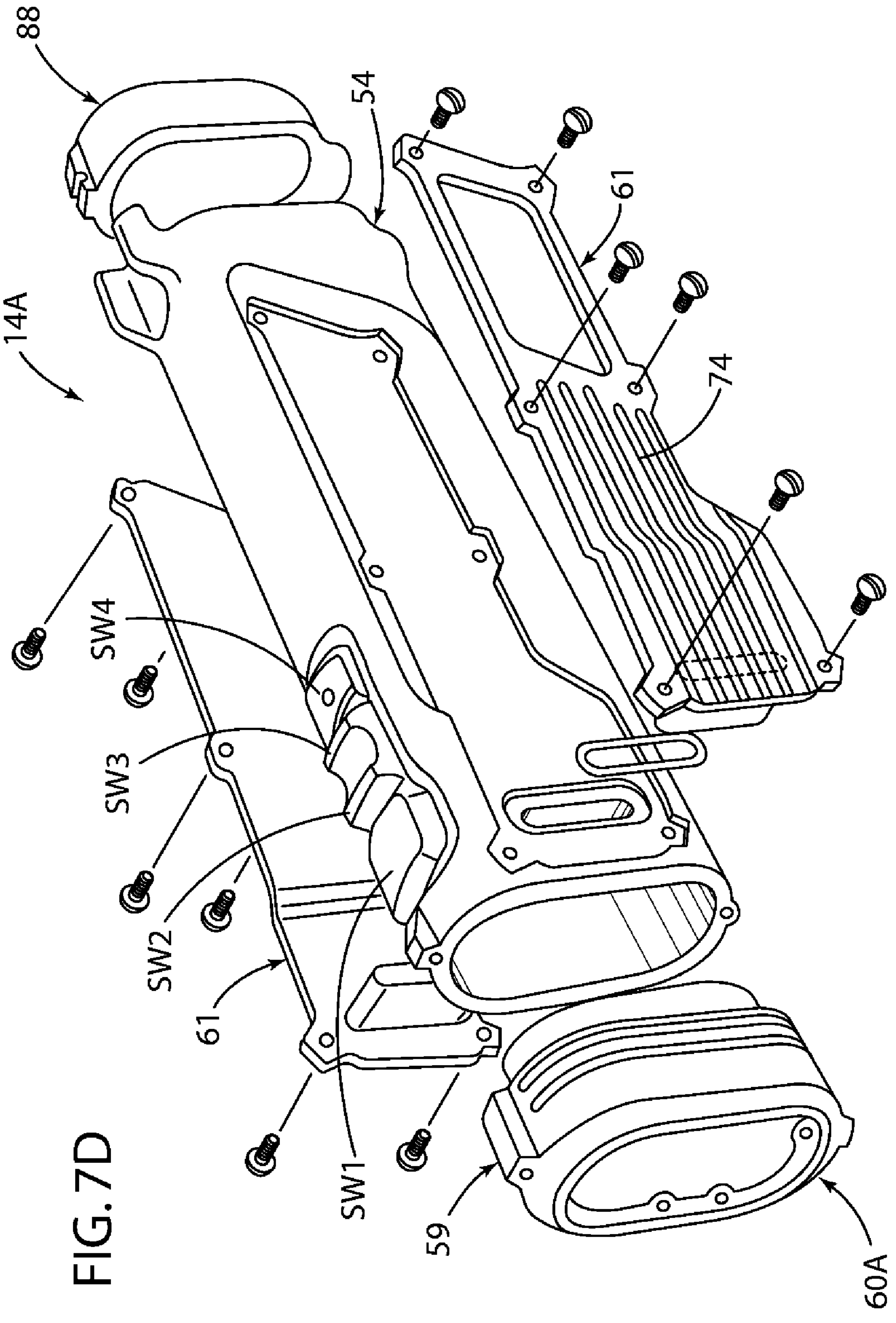
FIG. 7D is an exploded view of a handheld lighting device of a lighting system, in accordance with an alternate embodiment of the present invention.

In regards to FIGS. 1-6, a method of supplying electrical current from the power sources 16,20,22,24,26,27 is generally shown in FIG. 6 at reference identifier 1000. The method 1000 starts at step 1002, and proceeds to step 1004, wherein the at least one switch SW1 or SW4 is actuated, according to one embodiment. At step 1006, the voltage potential of at least one of the power sources 16,20,22,24,26,27 are determined. At decision step 1008, it is determined if an external power source 20,22,24,26,27 is connected to the lighting device 14A,14B,14C. According to one embodiment, the external power sources 20,22,24,26,27 have a greater voltage potential than the internal power source 16 when the external power source 20,22,24,26,27 is charged (e.g., energy storage system 24), and thus, by determining the voltage potential of the power sources 16,20,22,24,26,27 at step 1006, when there are multiple determined voltage potentials, then the higher voltage potential is assumed to be the external power source 20,22,24,26,27.

If it is determined at decision step 1008 that there is not an external power source 20,22,24,26, or 27 connected to the lighting device 14A,14B,14C, then the method 1000 proceeds to step 1010, wherein the internal battery selector 38 is turned on. At step 1012, electrical current is supplied from the internal power source 16 to a lighting source 18A,18B,18C through the first electrical path 28, and the method 1000 then ends at step 1014. However, if it is determined at decision step 1008 that one of the external power sources 20,22,24,26, or 27 is connected to the lighting device 14A,14B,14C, then the method 1000 proceeds to step 1016, wherein the external battery selector 40 is turned on. At step 1018, electrical current is supplied from the external power source 20,22,24,26, or 27 to the lighting source 18A,18B,18C through the second electrical path 30, and the method 1000 then ends at step 1014. It should be appreciated by those skilled in the art that if the external power source 20,22,24,26, or 27 is connected to the lighting device 14A,14B,14C, after the switch SW1 or SW4 has been actuated to turn on the lighting source 18A, 18B,18C, then the method 1000 starts at step 1002, and proceeds directly to step 1006, wherein the voltage potential of the power sources 16,20,22,24,26,27 is determined.

With regards to FIGS. 1-5 and 7-11, the lighting devices 14A,14B,14C can include a voltage regulator 42 (FIGS. 2B, 3B, and 4B). According to one embodiment, the voltage regulator 42 is a 3.3 voltage regulator, wherein the voltage regulator 42 receives an electrical current from the internal power source 16, the external power source 20,22,24,26, or 27, or a combination thereof. Typically, the voltage regulator 42 determines which of the internal power source 16 and the external power source 20,22,24,26,27 have a higher voltage potential, and uses that power source 16,20,22,24,26, or 27 to power the processor 36. However, it should be appreciated by those skilled in the art that the voltage regulator 42 can include hardware circuitry, execute one or more software routines, or a combination thereof to default to the internal power source 16 or the external power source 20,22,24,26,27, when present, to power the processor 36. Thus, the voltage regulator 42 regulates the voltage of the selected power source 16,20,22,24,26,27 to supply electrical power at a regulated voltage potential to the processor 36.

Additionally or alternatively, the lighting devices 14A, 14B,14C can include a converter 44, a voltage limiter 46, at least one LED driver, a reference voltage device 48, at least one fuel gauge driver, a temperature monitor device generally indicated at 50, or a combination thereof, as described in greater detail herein. The processor 36 can communicate with a memory device to execute one or more software routines, based upon inputs received from the switches SW1,SW2, SW3,SW4, the temperature monitor device 50, the like, or a combination thereof. According to one embodiment, the converter 44 is a buck-boost converter that has an output DC voltage potential from the input DC voltage potential, and the voltage limiter 46 limits the voltage potential of the electrical current supplied to the lighting sources 18A,18B,18C to suitable voltage potentials. The plurality of LED drivers can include, but are not limited to, a flood LED driver 52A, a spot LED driver 52B, and a red LED driver 52C that corresponds to the respective lighting source 18A,18B,18C. According to one embodiment, the reference voltage device 48 supplies a reference voltage potential of 2.5 Volts to the processor 36 and temperature monitor device 50.

According to one embodiment, the lighting devices 14A, 14B,14C, the AC power source 20, the DC power source 22, or a combination thereof include components that are enclosed in a housing generally indicated at 54. Additionally or alternatively, the energy storage system 24, the solar power source 26, the solar energy storage system 27, or a combination thereof can include components that are enclosed in the housing 54. According to one embodiment, the housing 54 is a two-part housing, such that the housing 54 includes corresponding interlocking teeth 56 that extend along at least a portion of the connecting sides of the housing 54. According to one embodiment, the interlocking teeth 56 on a first part of the two-part housing interlock with corresponding interlocking teeth 56 of a second part of the two-part housing in order to align the corresponding parts of the housing 54 during assembly of the device. The interlocking teeth 56 can also be used to secure the parts of the housing 54. However, it should be appreciated by those skilled in the art that additional connection devices, such as mechanical connection devices (e.g., threaded fasteners) or adhesives, can be used to connect the parts of the housing 54. Further, the interlocking teeth 56 can be shaped, such that a force applied to a portion of the housing 54 is distributed to other portions of the two-part housing 54 along the connection point of the interlocking teeth 56.

Figure 8A:
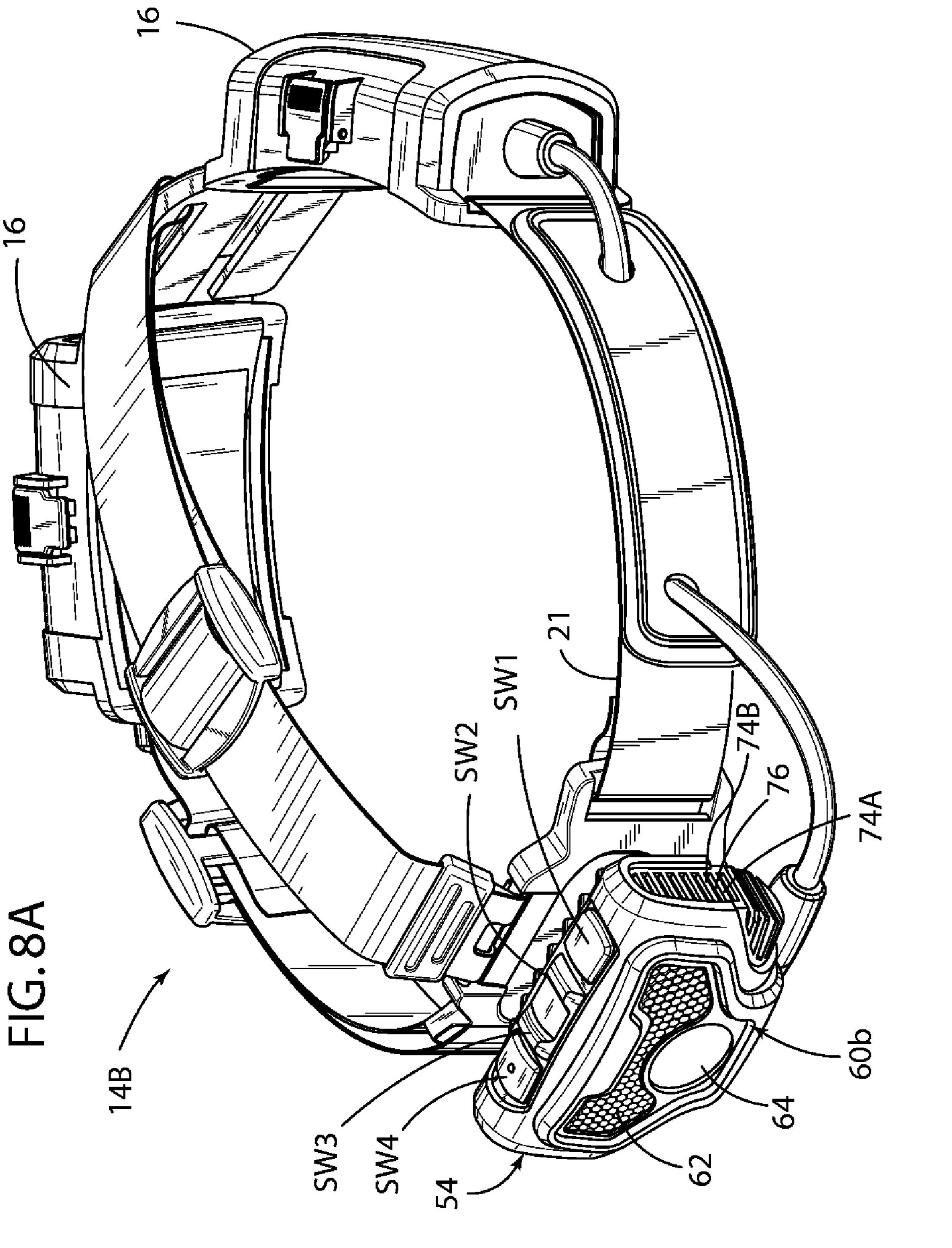
FIG. 8A is a front perspective view of a headlight lighting device of a lighting system, in accordance with one embodiment of the present invention.
Figure 8B:
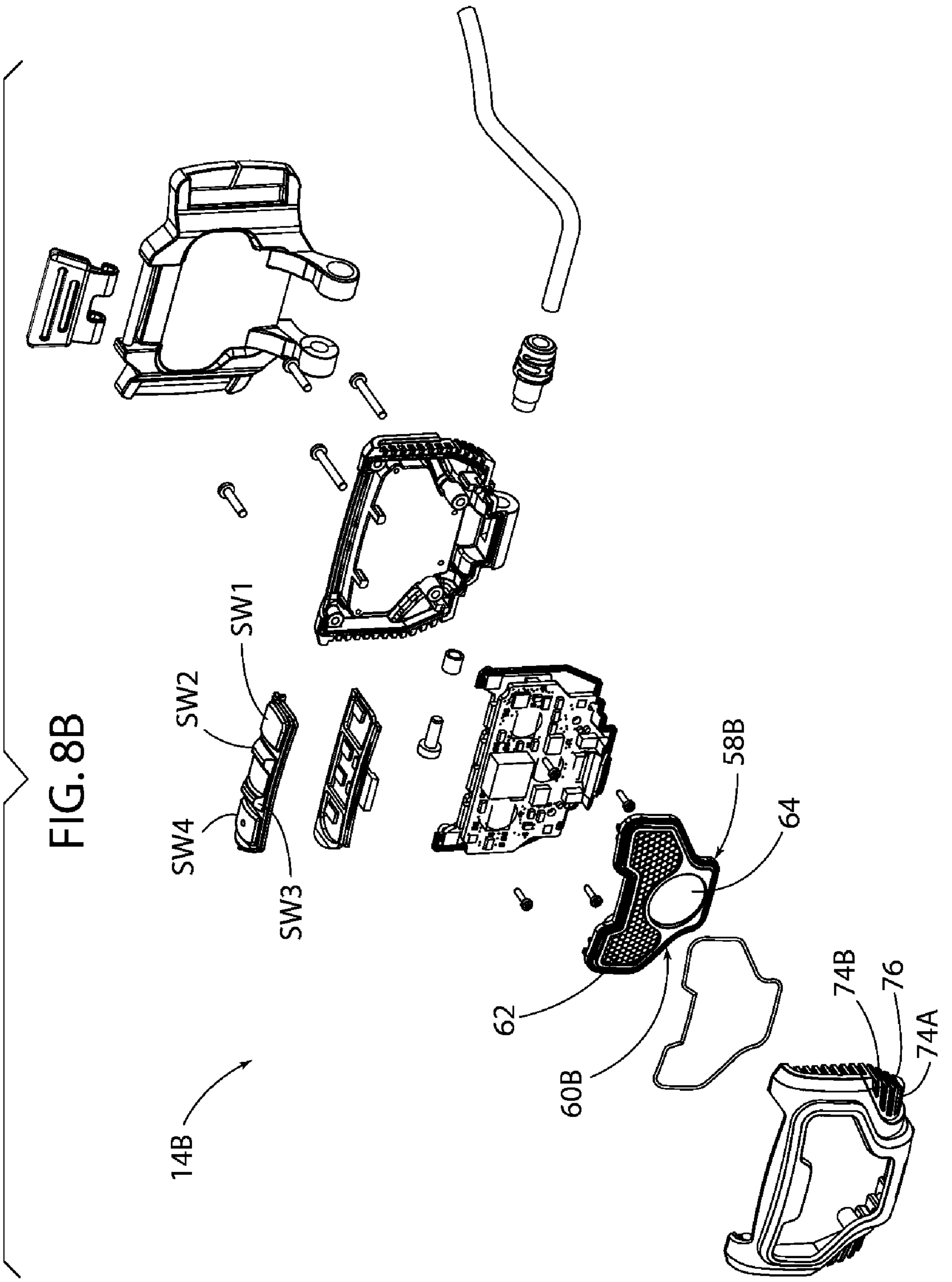
FIG. 8B is an exploded view of the headlight lighting device of the lighting system, in accordance with one embodiment of the present invention.
Figure 8C:
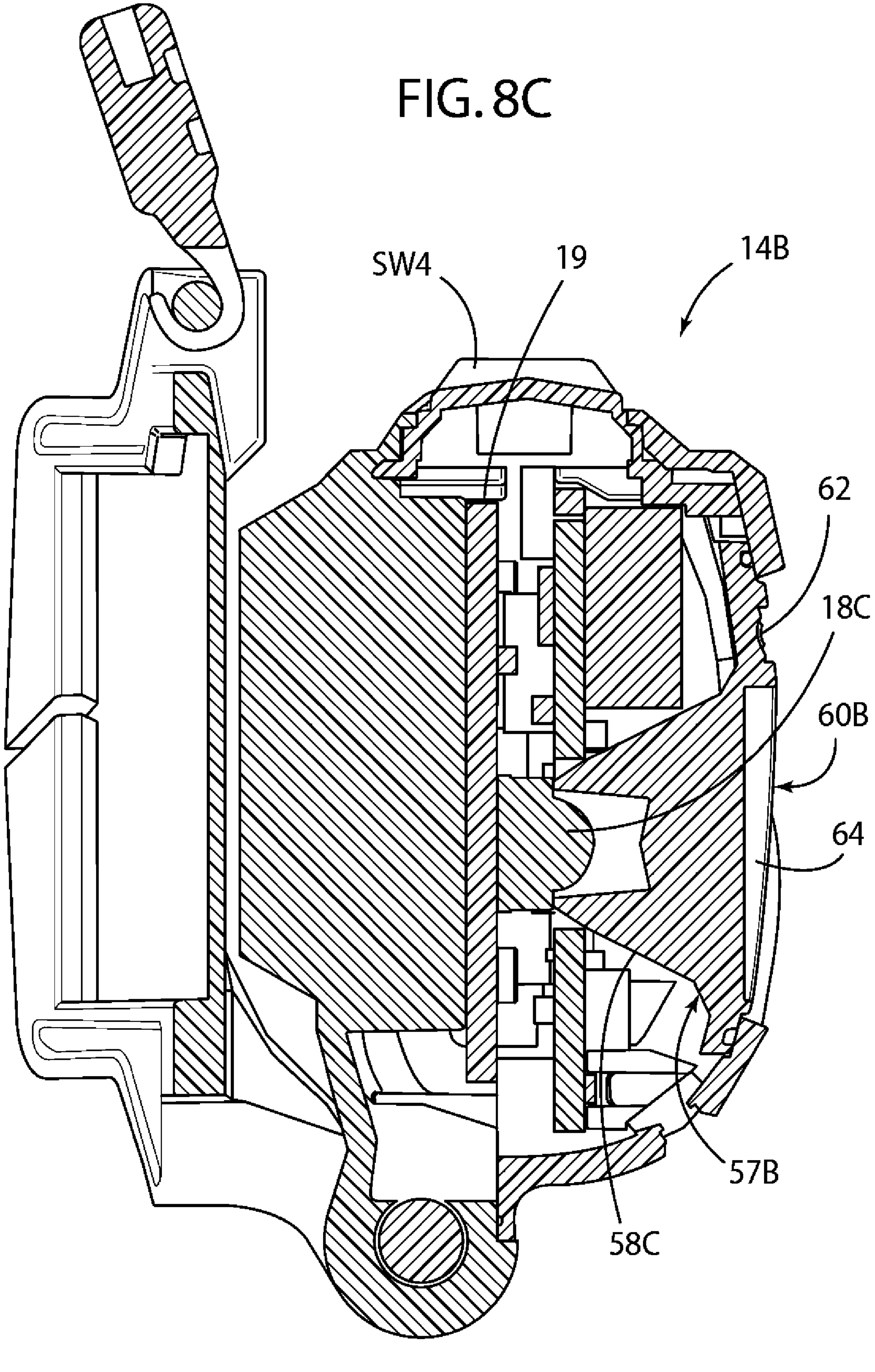
FIG. 8C is a cross-sectional view of the headlight lighting device of the lighting system, in accordance with one embodiment of the present invention.
Figure 8D:
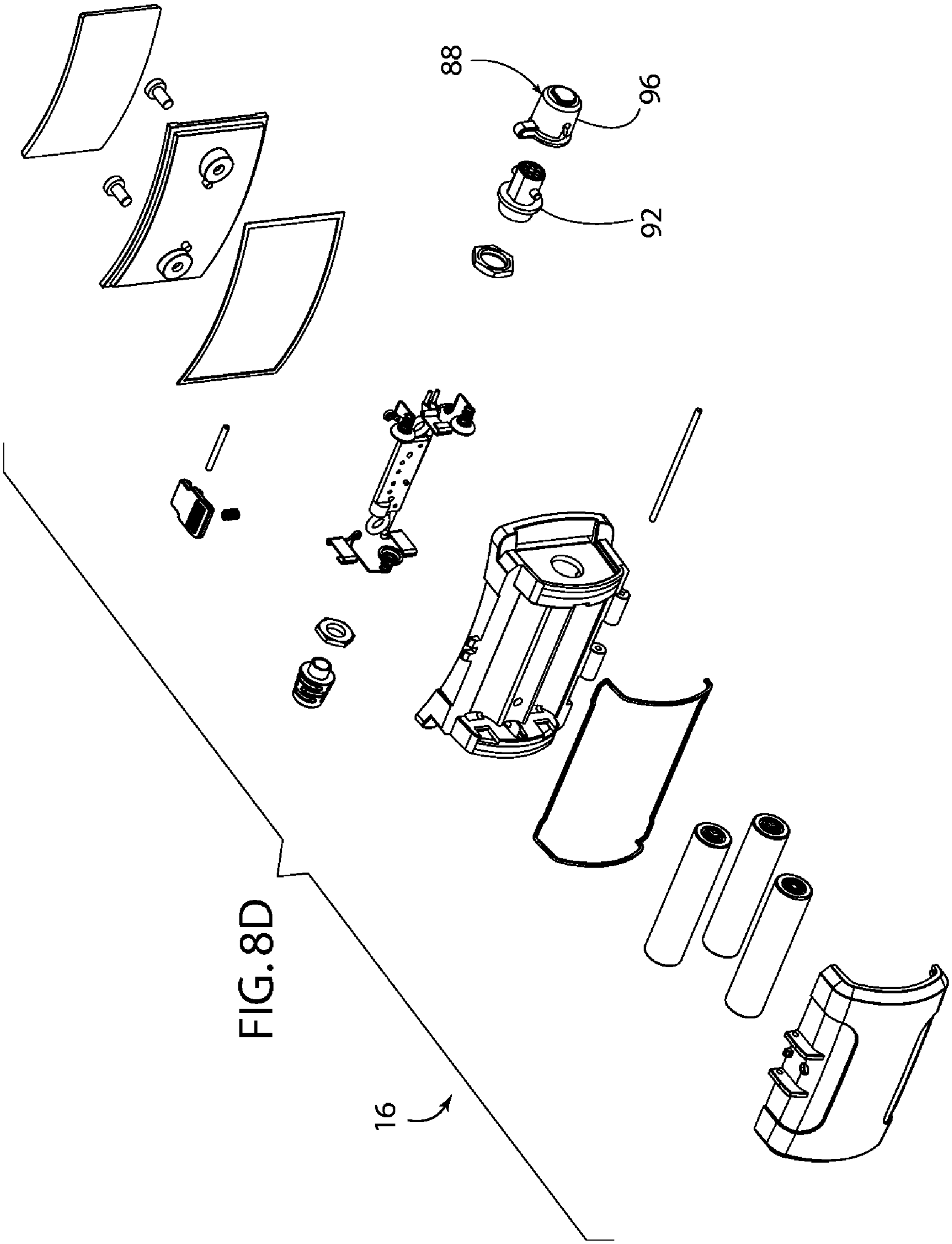
FIG. 8D is an exploded view of an internal power source of the headlight lighting device of the lighting system, in accordance with one embodiment of the present invention.
Figure 9A:
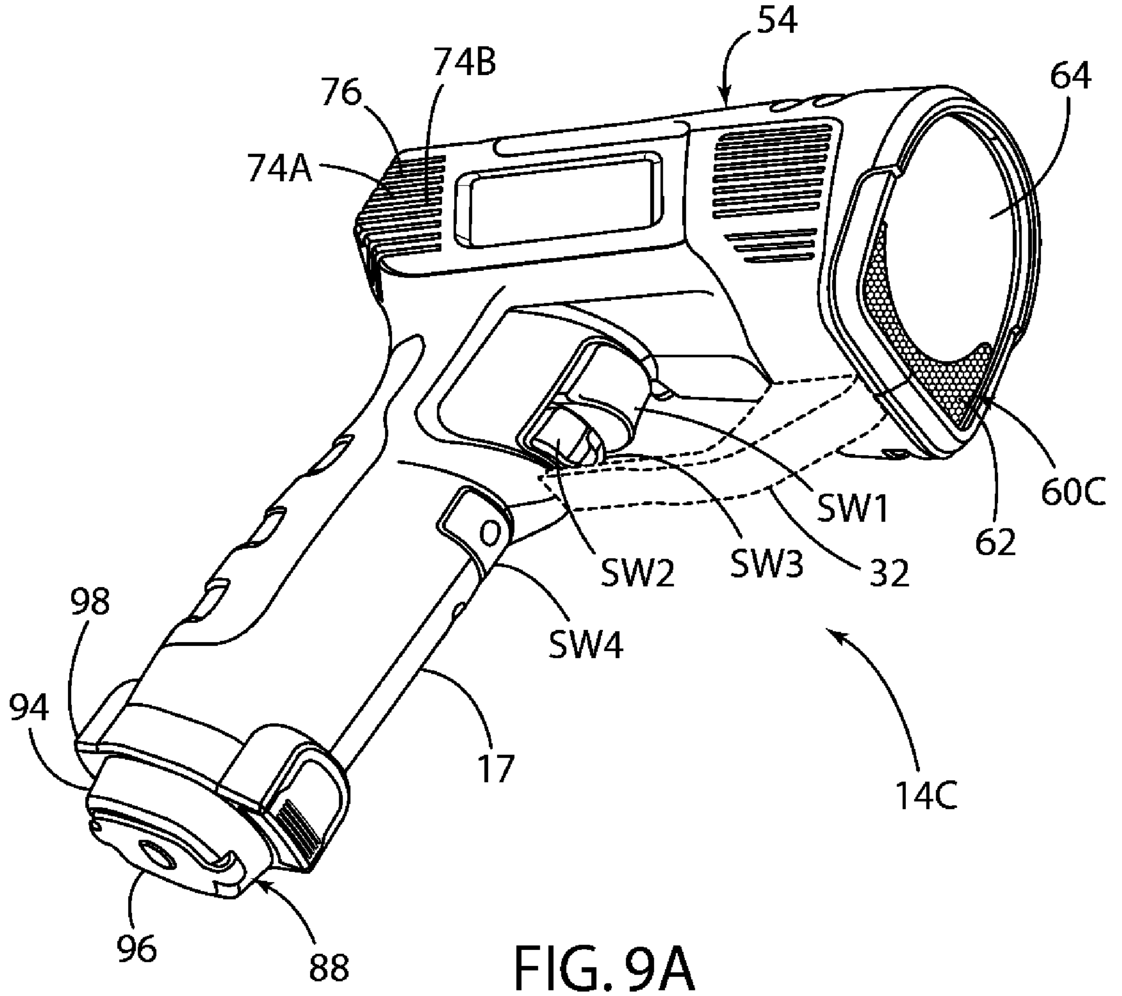
FIG. 9A is a side perspective view of a spotlight lighting device of a lighting system, in accordance with one embodiment of the present invention.
Figure 9B:
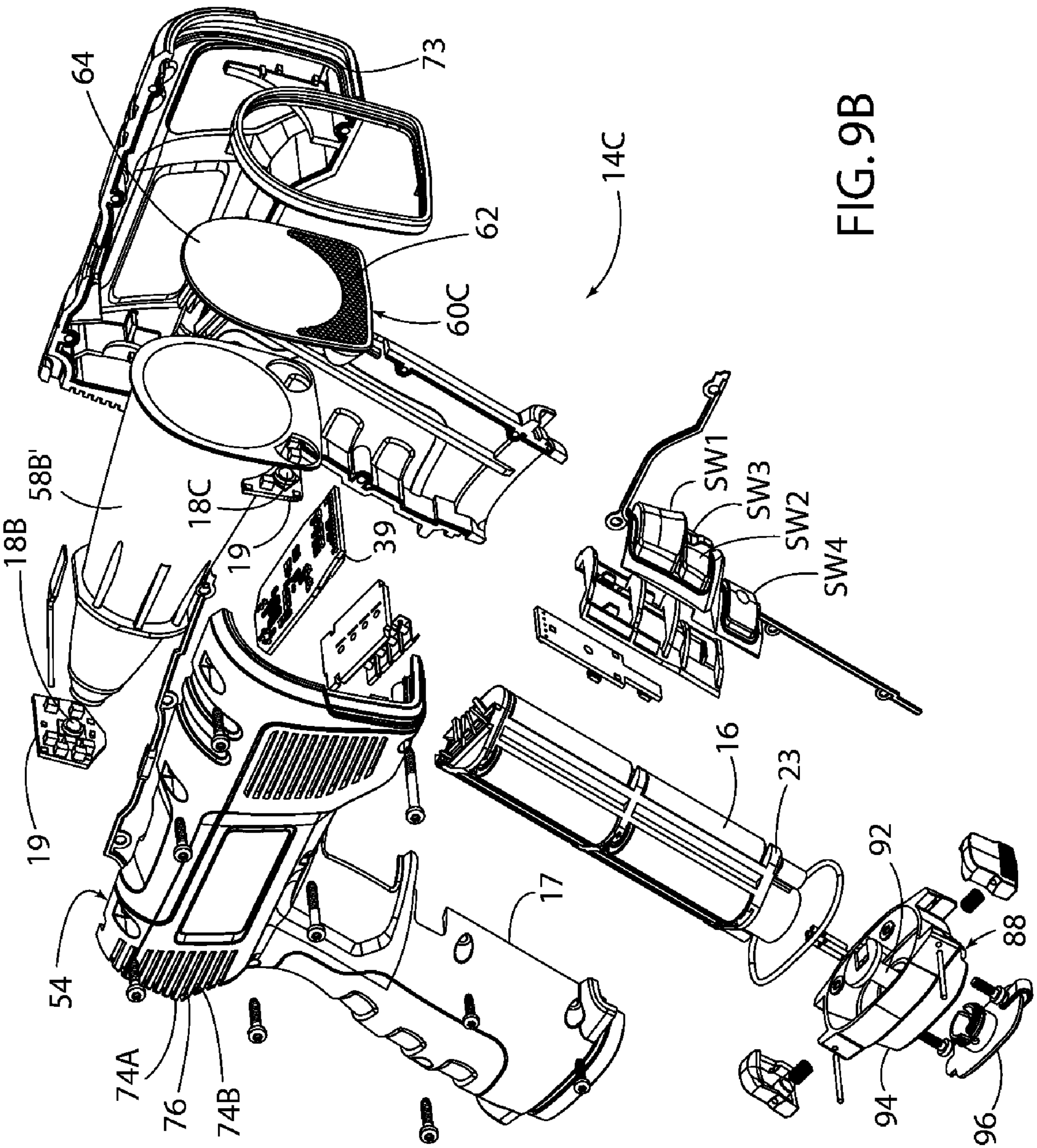
FIG. 9B is an exploded view of the spotlight lighting device of the lighting system, in accordance with one embodiment of the present invention.
Figure 9C:
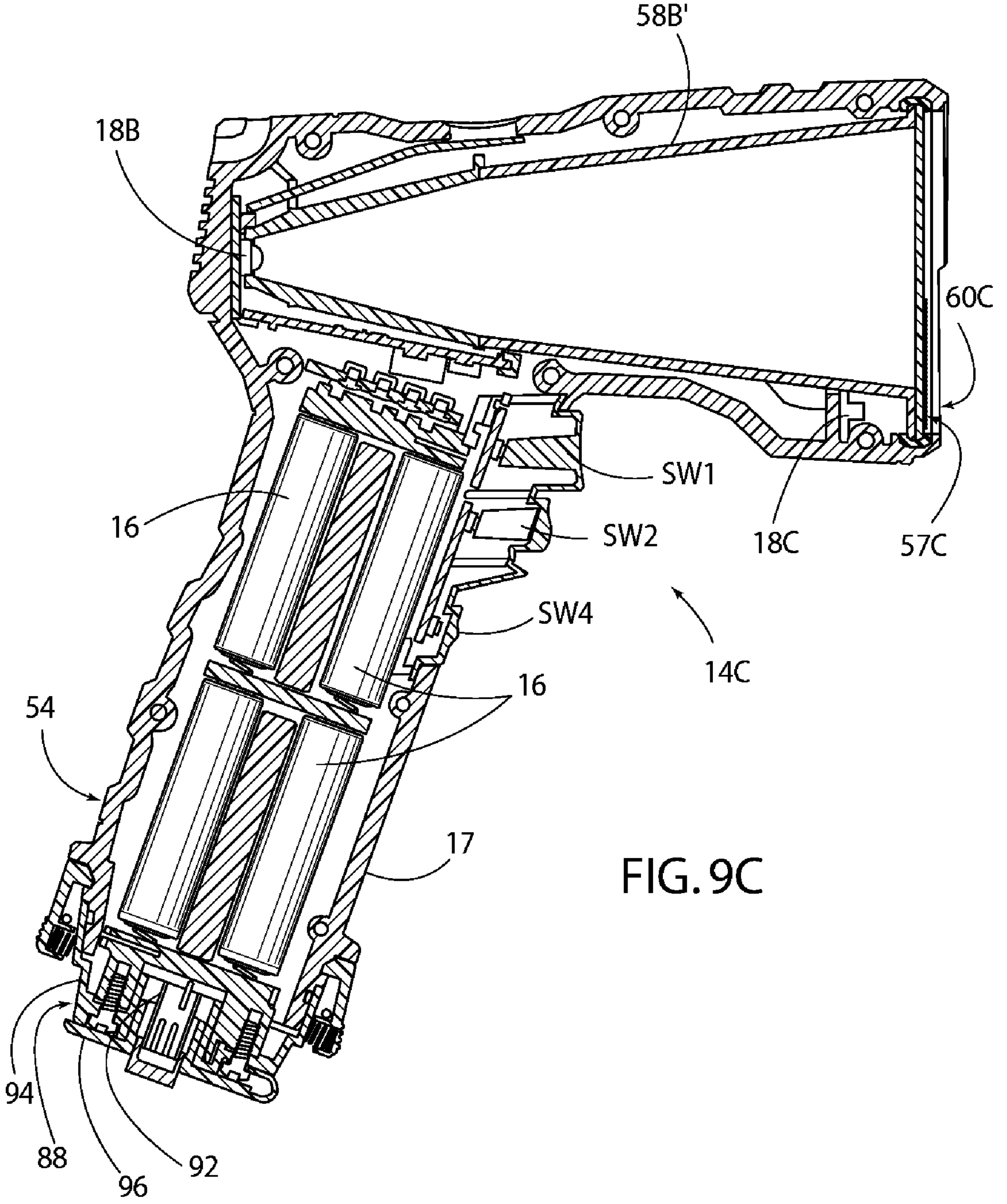
FIG. 9C is a cross-sectional view of the spotlight lighting device of the lighting system, in accordance with one embodiment of the present invention.

According to one embodiment, the handheld lighting device 14A has the internal power source 16, which includes three (3) AA size batteries connected in series. Typically, at least two of the AA batteries are positioned side-by-side, such that the three (3) AA size batteries are not each end-to-end, and a circuit board 39 is positioned around the three (3) AA size batteries within the housing 54. According to one embodiment, the internal power source 16 of the headlight lighting device 14B is not housed within the same housing as the light sources 18A,18B,18C, but can be directly electrically connected to the lighting sources 18A,18B,18C and mounted on the headband 21 as the housing 54 enclosing the lighting sources 18A,18B,18C. Thus, the internal power source 16 of the headlight lighting device 14B differs from the external power sources 20,22,24,26,27 that connect to the headlight lighting device 14B with the electrical connector 12. Further, the headlight lighting device 14B can include one or more internal power sources 16 that have batteries enclosed therein. Typically, the internal power source 16 of the headlight lighting device 14B includes three (3) AAA size batteries, as shown in FIG. 8D. Typically, AAA size batteries are used in the headlight lighting device 14B in order to reduce the weight of the headlight lighting device 14B, which is generally supported by the user's head, when compared to the weight of other size batteries (e.g., AA size batteries, C size batteries, etc.). According to one embodiment, the spotlight lighting device 14C has the internal power source 16, which includes six (6) AA size batteries, each supplying about 1.5 Volts, and electrically coupled in series to provide a total voltage potential of about nine Volts (9V). Typically, the six (6) AA size batteries are placed in a clip device 23 and inserted into the handle 17 of the housing 54 of the spotlight lighting device 14C, as shown in FIG. 9B. However, it should be appreciated by those skilled in the art that batteries of other shapes, sizes, and voltage potentials can be used as the internal power source 16 of the lighting devices 14A,14B,14C.

In regards to FIGS. 1 and 11A-11C, the solar power source 26 includes a film material 29 having panels, wherein the panels receive radiant solar energy from a solar source, such as the sun. According to one embodiment, the film material 29 includes one (1) to five (5) panels. The film material 29, via the panels, receives or harvests the solar energy, such that the solar energy is converted into an electrical current, and the electrical current is propagated to the lighting device 14A,14B,14C or the energy storage system 24,27 through the electrical connector 12. According to one embodiment, the solar radiation received by the solar power source 26 is converted into an electrical current having a voltage potential of approximately eight Volts (8V). Further, film material 29 can be a KONARKA™ film material, such as a composite photovoltaic material, in which polymers with nano particles can be mixed together to make a single multi-spectrum layer (fourth generation), according to one embodiment. According to other embodiments, the film material 29 can be a single crystal (first generation) material, an amorphous silicon, a polycrystalline silicon, a microcrystalline, a photoelectrochemical cell, a polymer solar cell, a nanocrystal cell, and a dyesensitized solar cell. Additionally, the solar power source 26 can include protective cover films 31 that cover a top and bottom of the film material 29. For purposes of explanation and not limitation, the protective cover film 31 can be any suitable protective cover film, such as a laminate, that allows solar radiation to substantially pass through the protective cover film 31 and be received by the film material 29.

According to one embodiment, the film material 29 and the protective cover film 31 are flexible materials that can be rolled or wound about a mandrel 33. The mandrel 33 can have a hollow center, such that the electrical connector 12 or other components can be stored in the mandrel 33. Straps 35 can be used to secure the film material 29 and the protective cover film 31 to the mandrel when the film material 29 and protective cover film 31 are rolled about the mandrel 33 or in a rolled-up position, according to one embodiment. Additionally, the straps 35 can be used to attach the solar power source 26 to an item, such as, but not limited to, a backpack or the like, when the film material 29 and protective cover film are not rolled about the mandrel 33 or in a solar radiation harvesting position. Additionally or alternatively, end caps 37 can be used to further secure the film material 29 and protective cover film 31 when rolled about the mandrel 33, and to provide access to the hollow interior of the mandrel 33.

According to an alternate embodiment, the film material 29 can be a foldable material, such that the film material 29 can be folded upon itself in order to be stored, such as when the solar power source 26 is in a non-solar radiation harvesting position. Further, the film material 29, when in the folded position, can be stored in the mandrel 33, other suitable storage containers, or the like. Additionally, the protective cover film 31 can be a foldable material, such that both the film material 29 and protective cover film 31 can be folded when in a non-solar radiation harvesting position. The film material 29 and protective cover film 31 can then also be un-folded when the film material 29 is in a solar radiation harvesting position.

With respect to FIGS. 1-5 and 7-12, the electrical connector 12 includes a plurality of pins 41 (FIG. 12) connected to a plurality of electrical wires 43 that extend longitudinally through the electrical connector 12, according to one embodiment. Typically, the plurality of pins 41 are positioned, such that the pins 41 matingly engage to make an electrical connection with a electrical component of the device 14A,14B,14C,20,22,24,26,27 that is connected to the electrical connector 12. Thus, the electrical wires 43, and the pins 41, can communicate or propagate an electrical current between one of the light devices 14A,14B,14C and one of the external power sources 20,22,24,26, or 27 and between the external power sources (i.e. the AC power source 20 to the energy storage system 24) at different voltage potentials. According to one embodiment, the electrical connector 12 communicates an intelligence signal from the power source 20,22,24,26,27 to the lighting device 14A,14B,14C, such that the lighting device 14A,14B,14C can confirm that the electrical connector 12 is connecting a suitable external power source to the connected lighting device 14A,14B,14C.

According to one embodiment, the connector 41 includes an outer sleeve 45 having a first diameter and an inner sleeve 47 having a second diameter, wherein the second diameter is smaller than the first diameter. The connector 41 can further include a retainer 49 that surrounds at least a portion of the plurality of pins 41 and the electrical wires 43, according to one embodiment. The retainer 49, in conjunction with other components of the electrical connector 12, such as the outer sleeve 45 and inner sleeve 47, form a water-tight seal, so that a waterproof connection between the pins 41 and the electrical components of the connected device 14A,14B,14C,20,22,24,26,27.

Additionally or alternatively, the connector 41 includes a quarter-turn sleeve 51, which defines at least one groove 53 that extends at least partially circumferentially, at an angle, around the quarter-turn sleeve 51. According to one embodiment, the electrical connector 12 includes a flexible sleeve 55 at the non-connecting end of the quarter-turn sleeve 51 that connects to a protective sleeve 59. Typically, the protective sleeve 59 extends longitudinally along the length of the electrical connector 12 to protect the wires 43, and the flexible sleeve 55 allows the ends of the electrical connector 12 to be flexible so that the pins 41 can be correctly positioned with respect to a receiving portion of the device 14A,14B,14C,20,22,24,26, or 27.

The spotlight lighting device 14C can also include a switch guard 32, according to one embodiment. Additionally or alternatively, the devices 14A,14B,14C,20,22,24,26,27 can include the tail cap assembly 88. The tail cap assembly 88 includes a hinge mechanism 90, wherein at least one cover is operably connected to the hinge mechanism 90, such that the at least one cover pivots about the hinge mechanism 90. According to one embodiment, a connector 92 is attached or integrated onto a cover 94, wherein the connector 92 is the corresponding male portion to the electrical connector 12. The connector 92 can include a flange that is positioned to slidably engage the groove 53 of the electrical connector 12 when the connector 92 is being connected and disconnected from the electrical connector 12, according to one embodiment. The connector 92 is electrically connected to the lighting sources 18A,18B,18C when the cover 94 is in a fully closed positioned, such that when one of the external power sources 20,22,24,26, or 27 is connected to one of the lighting devices 14A,14B, or 14C by the electrical connector 12 being connected to the connector 92, the external power source 20,22,24,26,27 propagates an electrical current to the lighting sources 18A,18B,18C. When the cover 94 is in an open position, the connector 92 is not electrically connected to the lighting sources 18A,18B,18C, and the internal power source 16 can be inserted and removed from the lighting device 14A,14B,14C.

According to an alternate embodiment, the tail cap assembly 88 includes a second cover 96 that covers the connector 92 when in a fully closed position. Typically, the second cover 96 is operably connected to the hinge mechanism 90, such that the second cover pivots about the hinge mechanism 90 along with the cover 94. When the second cover 96 is in the fully closed position, the electrical connector 12 cannot be connected to the connector 92, and when the second cover 96 is in an open position, the electrical connector 12 can be connected to the connector 92. Thus, the connector 92 does not have to be exposed to the environment that the lighting device 14A,14B,14C is being operated in, when the connector 92 is not connected to the electrical connector 12. Further, the tail cap assembly 88 can include a fastening mechanism 98 for securing the cover 94,96 when the cover 94,96 is in the fully closed position.

The energy storage system 24 and the solar power energy storage system 27 include a plurality of battery cells including at least a first battery cell 78 and a second battery cell 80, according to one embodiment. The exemplary embodiments described herein are generally discussed with respect to the first and second battery cells 78,80; however, it should be appreciated by those skilled in the art that any suitable number of battery cells can be used in the energy storage system 24 or the solar power energy storage system 27, such as, but not limited to, three (3) or four (4) battery cells used in the energy storage system 24 or the solar power energy storage system 27. According to one embodiment, the power source 20,22,26,27 supplies an electrical current to the energy storage system 24 having a voltage potential of approximately eight Volts (8V) to twelve Volts (12V).

II. Energy Storage System

In regards to FIGS. 1, 5A-5B, 10A-10D, 13, 14A, and 14B, the energy storage system 24 and the solar power energy storage system 27 include a plurality of battery cells including at least a first battery cell 78 and a second battery cell 80, according to one embodiment. The exemplary embodiments described herein are generally discussed with respect to the first and second battery cells 78,80; however, it should be appreciated by those skilled in the art that any suitable number of battery cells can be used in the energy storage system 24 or the solar power energy storage system 27, such as, but not limited to, there (3) or four (4) battery cells used in the energy storage system 24 or the solar power energy storage system 27. A power source, such as the external power sources, including the AC power source 20, the DC power source 22, and the solar power source 26 can be electrically connected to the plurality of battery cells with the electrical connector 12. Thus, the battery cells 78,80 can be configured to electrically connect to the external power source 20,22,26, 27. According to one embodiment, the power source 20,22, 26,27 supplies an electrical current to the energy storage system 24 having a voltage potential of approximately eight Volts (8 V) to twelve Volts (12 V). A controller 82 is in communication with the plurality of battery cells, and controls the electrical current supplied to the battery cells 78,80 based upon the controller's 82 hardware circuitry, executing one or more software routines, or a combination thereof. The controller 82 can be a microprocessor or an other suitable controlling device that controls the electrical current propagated between the plurality of battery cells and the power source 20,22,26,27, according to one embodiment.

According to one embodiment, the controller 82 controls the electrical power supplied to the plurality of battery cells 78,80, such that the battery cells 78,80 can be charged using a quick charging method and a fully charged charging method. Generally, the quick charging method increases the state of charge of the battery cell 78,80 at a higher rate during a period of time than the fully charged charging method during the same length of time. Typically, the battery cell 78,80 is first charged using the quick charging method, and then charged using the fully charged charging method in order to obtain a one hundred percent (100%) state of charge. Typically, the quick charging rate charges the battery cells 78,80 at a quicker rate than the fully charged charging method. According to one embodiment, the quick charging method can include applying a substantially constant electrical current, and the fully charged charging method can include applying an electrical current that is tapered off in order to maintain a substantially constant voltage potential. Additionally or alternatively, the controller 82 can control the supply of electrical current to the battery cells 78,80 based upon a monitored temperature of at least one of the battery cells 78,80.

Figure 14B:
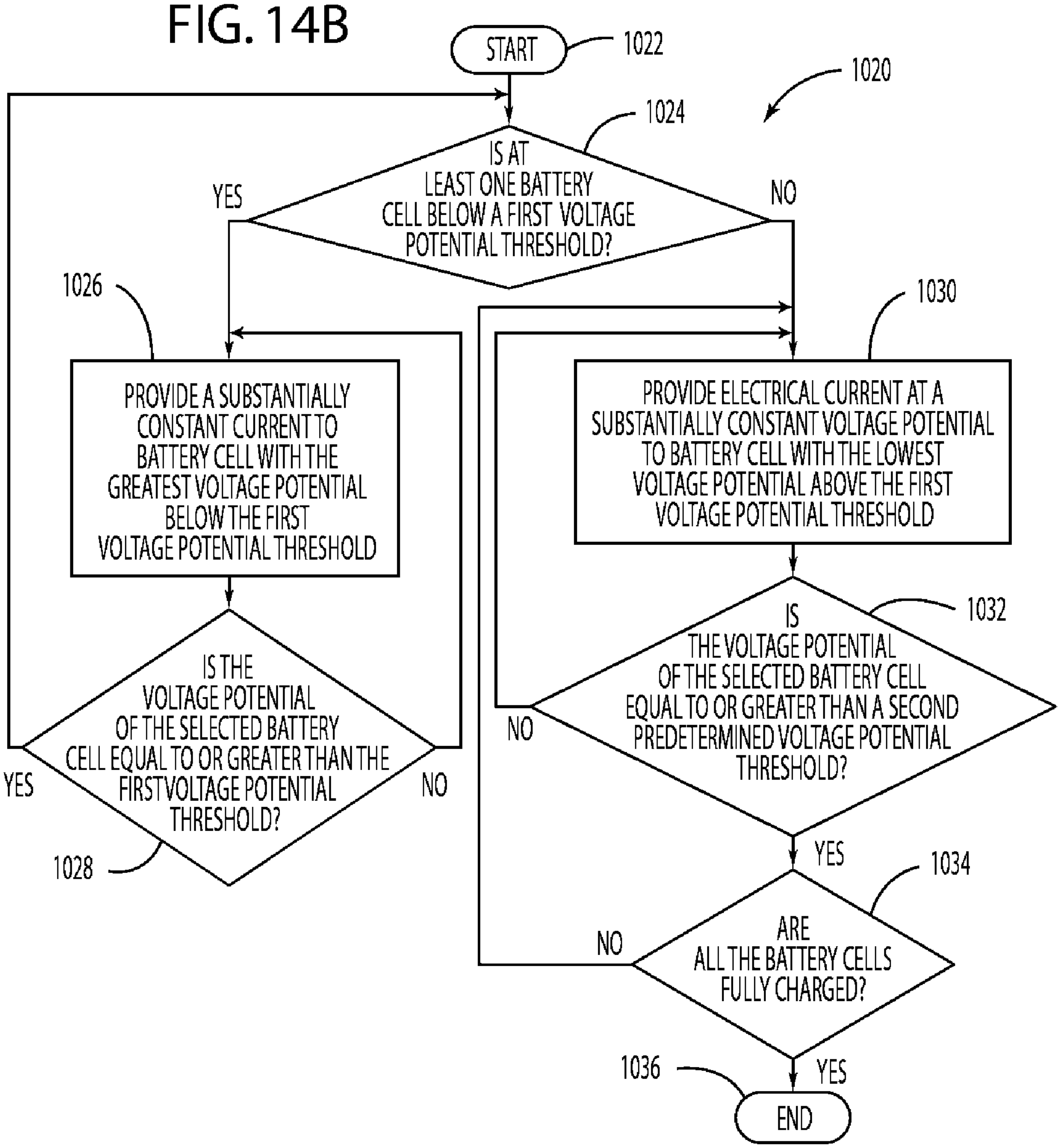
FIG. 14B is a flow chart illustrating a method of charging at least one battery cell of a device or system of a lighting system, in accordance with one embodiment of the present invention.
Figure 14A:
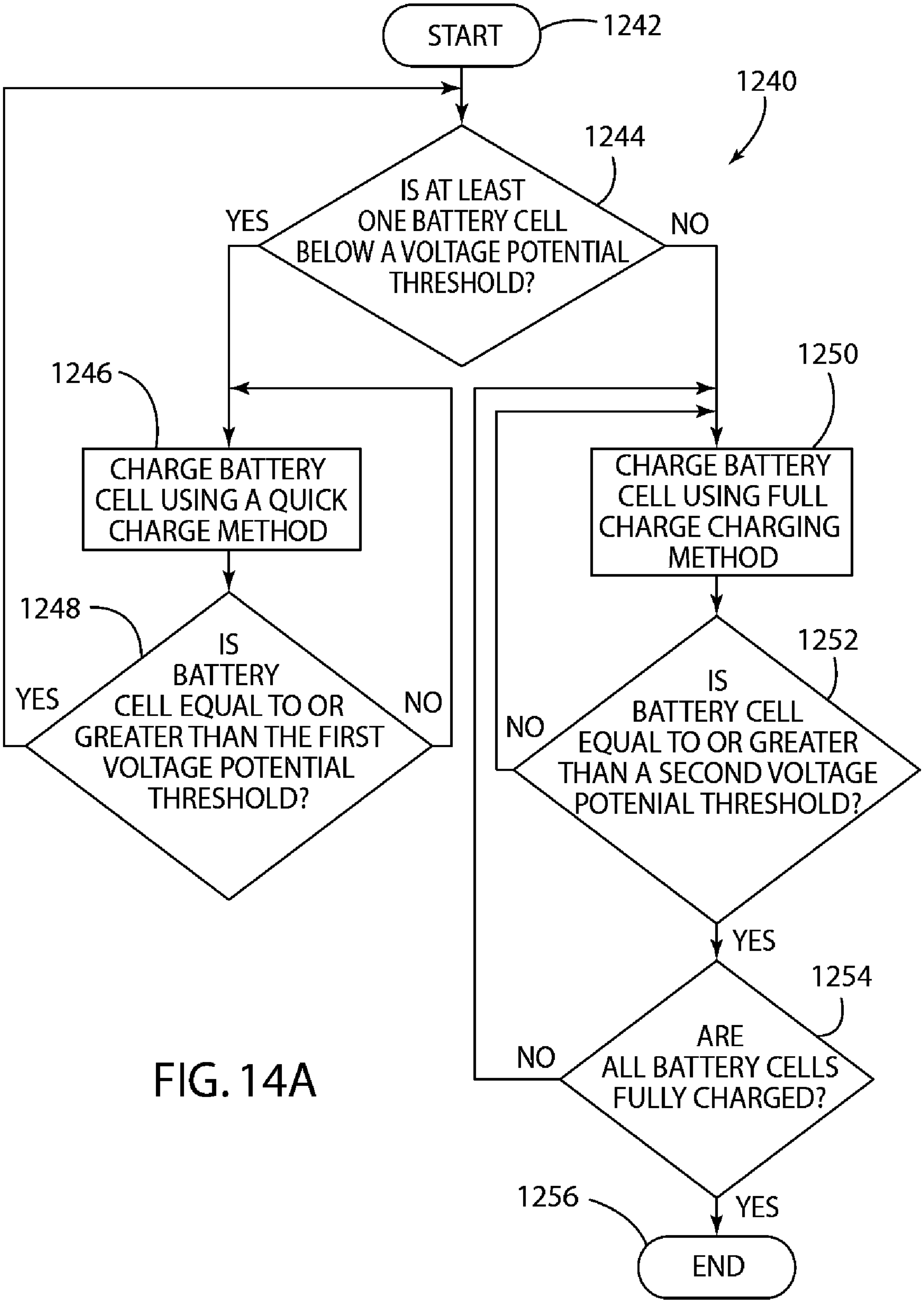
FIG. 14A is a flow chart illustrating a method of charging at least one battery cell of a device or system of a lighting system, in accordance with one embodiment of the present invention.

A method of charging the battery cells 78,80 is generally shown in FIG. 14A at reference identifier 1240, according to one embodiment. The method 1240 starts at step 1242, and proceeds to decision step 1244. At decision step 1244, it is determined if at least one of the battery cells 78,80 has a voltage potential or state of charge below a first state of charge. If it is determined at decision step 1244 that at least one battery cell 78,80 is below the first voltage potential threshold, then the method 1240 proceeds to step 1246. At step 1246, the battery cell 78,80 is charged using the quick charging method. According to one embodiment, the quick charging method includes supplying a substantially constant electrical current to the battery cell 78,80. At decision step 1248, it is determined if the battery cell 78,80 has a state of charge that is equal to or greater than the first voltage potential threshold. If it is determined at decision step 1248 that the battery cell 78,80 state of charge is not equal to or greater than the first voltage potential threshold, then the method 1240 returns to step 1246. However, if it is determined at decision step 1248 that the battery cell 78,80 has a state of charge that is equal to or greater than the first voltage potential threshold, then the method 1240 returns to step 1244.

If it is determined at decision step 1244 that none of the battery cells 78,80 have a voltage potential that is below the first voltage potential threshold, then the method 1240 proceeds to step 1250. At step 1250, the battery cell 78,80 is charged using the fully charged charging method. According to one embodiment, the fully charged charging method includes supplying an electrical current at a substantially constant voltage potential. At decision step 1252, it is determined if the battery cell 78,80 state of charge is equal to or greater than a second voltage potential threshold. If it is determined at decision step 1252 that the battery cell 78,80 state of charge is less than the second voltage potential threshold, then the method 1240 returns to step 1250. However, if it is determined at decision step 1252 that the battery cell 78,80 state of charge is equal to or greater than the second voltage potential threshold, then the method 1240 proceeds to step 1254, wherein it is determined if all of the battery cells 78,80 are fully charged. If it is determined at decision step 1254 that all of the battery cells 78,80 are not fully charged, then the method 1240 returns to step 1250. However, if it is determined at decision step 1254 that all of the battery cells 78,80 are fully charged, then the method 1240 ends at step 1256.

The controller 82 controls the electrical power supplied from the external power source 20,22,26,22, such that a substantially constant electrical current is supplied to the first and second battery cells 78,80, when a voltage potential of the first and second battery cells 78,80 is less than the voltage potential threshold, respectively. In this embodiment, the battery cells 78,80 are rechargeable cells and the external power source 20,22,26,27 provides a charging current.

The controller 82 also controls the electrical current supplied by the external power source 20,22,26,27, such that the electrical current is supplied at a substantially constant voltage potential from the external power source 20,22,26,27 to the first and second battery cells 78,80, when the voltage potential of the first and second battery cells 78,80 is equal to or greater than the first voltage potential threshold, respectively. The controller 82 controls the electrical current supplied from the external power source 20,22,26,27, such that the external power source 20,22,26,27 supplies a substantially constant electrical current to the first battery cell 78 prior to providing the substantially constant electrical current to the second battery cell 80, when the voltage potential of the first battery cell 78 is greater than the voltage potential of the second battery cell 80, and the voltage potential of both the first and second battery cells 78,80 is below the first voltage potential threshold.

According to one embodiment, the first and second battery cells 78,80 are Li-Ion battery cells. However, it should be appreciated by those skilled in the art that other types of electrochemical composition can be used in the battery cells, such as, but not limited to lithium or nickel metal hydride (NiMH) battery cells. It should further be appreciated by those skilled in the art that one or more battery cells having one or more electrochemical compositions can be used in the energy storage system 24 or the solar power energy storage system 27.

Typically, the battery cell 78,80 selected first for charging is the battery cell 78,80 with the greatest voltage potential that is less than a first voltage potential threshold, wherein the controller 82 begins to control the substantially constant electrical current supplied to the charging battery cell 78,80, rather than an electrical current at a substantially constant voltage potential. According to one embodiment, the selected battery cell 78,80 continues to be charged until the voltage potential of the selected battery cell 78,80 is at least equal to the first voltage potential level threshold, wherein the controller 82 can then select another battery cell 78,80 that is below the first voltage potential threshold. However, if none of the battery cells 78,80 have a voltage potential below the first voltage potential threshold, the controller 82 can begin an electrical current have a substantially constant voltage potential supplied to the battery cell 78,80 that has a first voltage potential threshold at least equal to the first voltage potential threshold.

The substantially constant electrical current is supplied to the selected battery cell 78,80 until the voltage potential of the selected battery cell 78,80 is at a second voltage potential. The controller 82 then controls the external power source 20,22,26,27 to supply the substantially constant electrical current to another battery cell 78,80.

For purposes of explanation and not limitation, the first voltage potential threshold can be the voltage potential of the battery cells 78,80 having an approximately seventy percent (70%) state of charge, and the second voltage potential threshold can be the voltage potential of the battery cells 78,80 having an approximately one hundred percent (100%) state of charge, wherein the controller 82 controls the electrical current to then be supplied to another or non-first-selected battery cell 78,80. It should be appreciated by those skilled in the art that there can be any number of suitable voltage potential values of the battery cells 78,80, wherein the controller 82 controls the electrical current supplied to the battery cells 78,80 to efficiently charge the battery cells 78,80 within an allotted charging time period.

According to an alternate embodiment, the selected battery cell 78,80 can be charged for a predetermined period of time in which the controller 82 then selects another battery cell 78,80 that has a voltage potential less than the first voltage potential threshold. If it is determined that none of the battery cells 78,80 of the energy storage system 24 have a voltage potential less than the first voltage potential threshold, then the controller 82 then selects one of the battery cells 78,80 to supply an electrical current at a substantially constant voltage potential and allowing the electrical current to taper.

Figure 13:
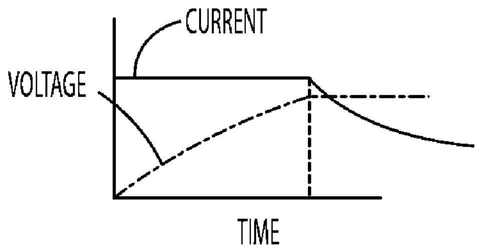
FIG. 13 is a graph illustrating the current and voltage supplied to a battery cell with respect of a period of time when charging the battery cell, in accordance with one embodiment of the present invention.

With respect to FIG. 13, the chart illustrates the relationship between the electrical current and the voltage potential of the electrical current applied to the battery cells 78,80 during the charging period. During a first period of time, such as when at least one of the battery cells 78,80 has a voltage potential below the first voltage potential threshold, the substantially constant current is supplied to the battery cell 78,80. During this period of time, the voltage potential of the electrical current progressively increases until a point where the battery cell 78,80 obtains a state of charge, or when the voltage potential of the battery cell 78,80 is at the first voltage potential threshold. At this point, the electrical current supplied to the battery cell 78,80 has a substantially constant voltage potential, and the amount of electrical current progressively decreases or tapers off. The point wherein the charging of the battery cell 78,80 changes from supplying a substantially constant current to an electrical current, a substantially constant voltage potential is when the battery cell 78,80 has a voltage potential of 4.2 Volts, according to one embodiment.

According to one embodiment, when the battery cells 78,80 are Li-Ion battery cells, the battery cells 78,80 can be charged by first selecting the battery cell 78,80 that has a voltage potential below the first voltage potential threshold for providing a substantially constant electrical current prior to providing an electrical current of a substantially constant voltage potential to any of the other battery cells 78,80. This quick charge is based upon chemical properties of the Li-Ion battery cell, which allows the battery cell 78,80 to obtain a quick charge by receiving a substantially constant electrical current until the battery cell 78,80 state of charge ranges from approximately seventy percent (70%) to approximately one hundred percent (100%). Then, the electrical current having a substantially constant voltage potential can be applied to the battery cell 78,80 in order to continue to charge the battery cell 78,80 at a slower rate, so that the state of charge of the battery cell 78,80 can be one hundred percent (100%).

Therefore, by first providing a substantially constant electrical current to the first battery cell 78,80 prior to providing an electrical current at a substantially constant voltage potential to any other battery cells 78,80, the battery cells 78,80 within the energy storage system 24,27 can be efficiently charged within the allowed charging time, when compared to fully charging the first selected battery and then fully charging another battery. In such an example, the charging period of a Li-Ion battery has a more efficient charging ratio (e.g., percent of state of charge increase to charging time) during the charging period, wherein the substantially constant current is supplied rather than the electrical current supplied at a substantially constant voltage potential.

By way of explanation and not limitation, if a Li-Ion battery cell is at zero percent (0%) state of charge and a substantially constant current is supplied to the Li-Ion battery cell until the state of charge is seventy percent (70%) during a first period of time. The state of charge is increased during a second period of time to one hundred percent (100%) by supplying an electrical current at a substantially constant voltage potential. When using the method described herein, the substantially constant current is supplied to the battery cells below a state of charge prior to supplying the electrical current at a substantially constant voltage potential. Thus, both the battery cells 78,80 are charged to seventy percent (70%) state of charge in a shorter time period than it would take to fully charge one battery cell. A user charging the battery cells has two battery cells at seventy percent (70%) state of charge rather than one battery cell at one hundred percent (100%) state of charge, and therefore, the ability to power the lighting devices 14A,14B,14C for a longer time.

According to one embodiment, the energy storage system 24 can receive electrical power from a plurality of different electrical sources that provide the electrical power within a range of voltages. By way of explanation and not limitation, the energy storage system 24 can receive electrical power from the AC power source 20 and the DC power source 22, which provides electrical power at approximately a voltage potential of 12 Volts, and the solar power source 26 that supplies electrical power at a voltage potential of approximately eight Volts (8 V). Further, the energy storage system 24 can provide electrical power to the lighting devices 14A,14B,14C at a voltage potential of approximately 3.6 Volts. According to one embodiment, the energy storage system 24 can include other types of electrical outlets, which are not received by the electrical connector 12, such as, but not limited to, a universal serial bus (USB) and an energy-to-go (ETG) connector. Thus, the energy storage system 24 can be used to provide electrical power to other devices, such as, but not limited to, computers, cellular phones, personal data assistants (PDAs), the like, or a combination thereof.

A method of controlling the electrical current provided from the external power sources 20,22,26,27 to the energy storage system 24 is generally shown in FIG. 14B at reference identifier 1020. The method 1020 starts at step 1022, and proceeds to decision step 1024, wherein it is determined if at least one battery cell 78,80 is below a first voltage potential threshold. If it is determined at decision step 1024 that at least one battery cell 78,80 is below the first voltage potential threshold, the method 1020 proceeds to step 1026, wherein a substantially constant current is provided to the battery cell 78,80 with the greatest voltage potential that is below the first voltage potential threshold. At step 1028, it is determined if the voltage potential of the selected battery cell 78,80 is equal to or greater than the first voltage potential threshold. If it is determined at decision step 1028 that the voltage potential of the selected battery cell 78,80 is equal to or greater than the first voltage potential threshold, then the method 1020 returns to step 1024. However, if it is determined at decision step 1028 that the voltage potential of the selected battery cell 78,80 is less than the first voltage potential threshold, then the method 1020 returns to step 1026.

If it is determined at decision step 1024 that at least one battery cell 78,80 is not below the first voltage potential threshold, then the method 1020 proceeds to step 1030, wherein an electrical current is provided at a substantially constant voltage potential to the battery cell 78,80 with the lowest voltage potential equal to or greater than the first voltage potential threshold. At decision step 1032, it is determined if the voltage potential of the selected battery cell 78,80 equal to or greater than a second voltage potential threshold. If it is determined at decision step 1032 that the voltage potential of the selected battery cell 78,80 is less than the second voltage potential threshold, then the method 1020 returns to step 1030. However, if it is determined at decision step 1032 that the voltage potential of the selected battery cell 78,80 is equal to or greater than the second voltage potential threshold, then the method 1020 proceeds to step 1034, wherein it is determined if all of the battery cells 78,80 are fully charged. If it is determined at decision step 1034 that not all of the battery cells 78,80 are fully charged, then the method 1020 returns to step 1030. However, if it is determined at decision step 1034 that all of the battery cells 78,80 are fully charged, then the method 1020 ends at step 1036.

According to one embodiment, the lighting system 10 can include the solar power energy storage system 27, wherein the solar power energy storage system 27 can be electrically connected to the plurality of solar power sources 26 using the electrical connector 12. Thus, the solar power energy storage system 27 can receive electrical energy from the plurality of solar power sources 26 and store the electrical power in the battery cells 78,80. The solar power energy storage system 27 can sum the solar radiation received and converted to an electrical current by the solar power source 26, and store the energy in the battery cells 78,80. Additionally or alternatively, the solar power energy storage system 27 can sum the solar radiation received and converted to an electrical current by the solar power source 26, wherein the electrical power is summed and passed through the solar energy storage system 27 to the lighting devices 14A,14B,14C. It should be appreciated by those skilled in the art that the battery cells 78,80 for storing the energy in the solar power energy storage system 27 can be any desirable electrochemical composition, and any suitable number of battery cells 78,80 can be used.

The solar power energy storage system 27 can also be electrically connected to other external power sources, such as the AC power source 22 and the DC power source 20, in order to charge the battery cell 78,80. According to one embodiment, the solar power energy storage system 27 charges the battery cell 78,80 using the charging method described above for charging the battery cell 78,80 of the energy storage system 24. Further, the lighting devices 14A,14B,14C can be electrically connected to the solar power energy storage system 27 by the electrical connector 12 in order for the solar power energy storage system 27 to provide an electrical current to the lighting devices 14A,14B,14C to illuminate the lighting sources 18A,18B,18C.

Figure 10A:
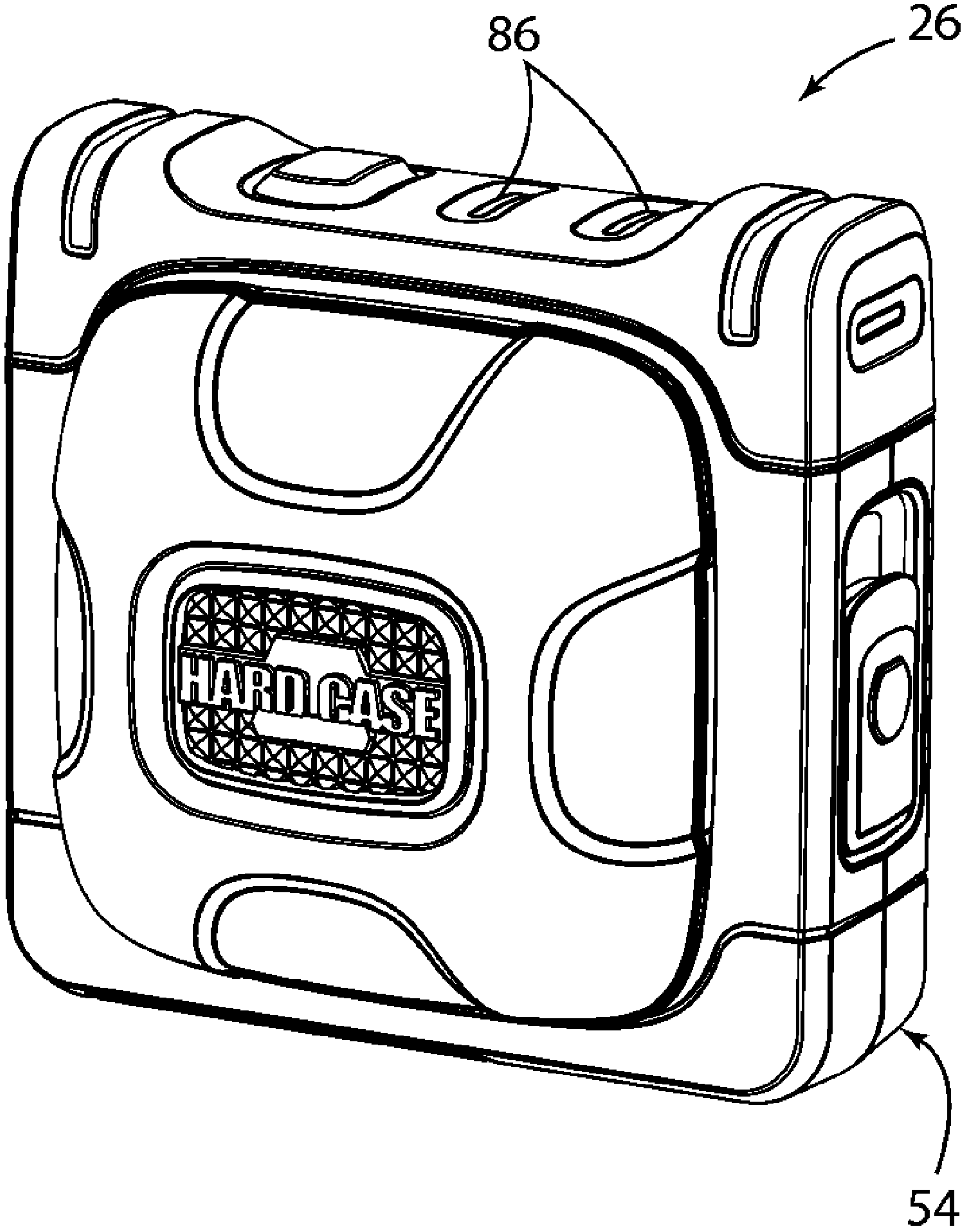
FIG. 10A is a front perspective view of an energy storage system of a lighting system, in accordance with one embodiment of the present invention.
Figure 10B:
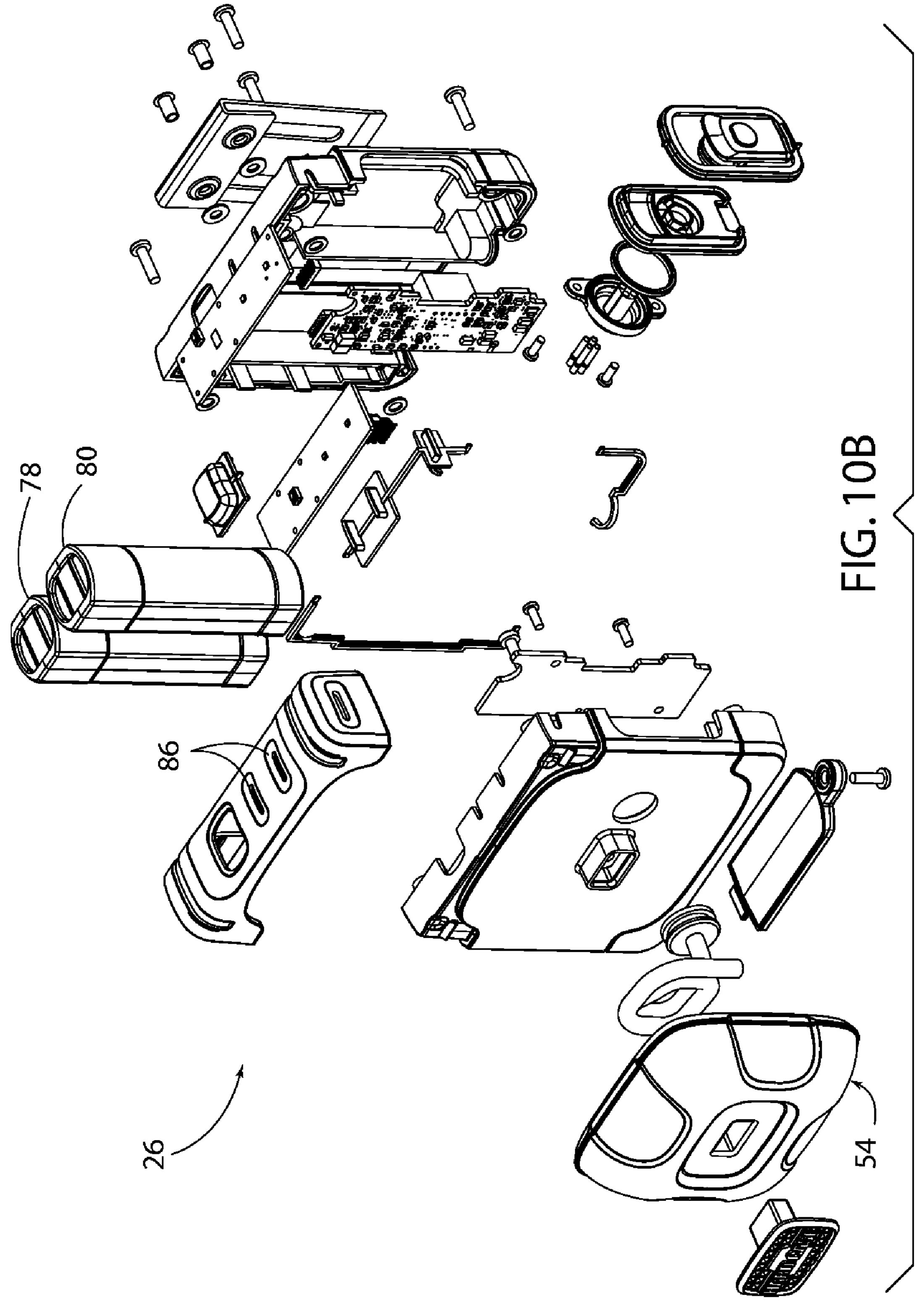
FIG. 10B is an exploded view of the energy storage system of the lighting system, in accordance with one embodiment of the present invention.
Figure 10C:
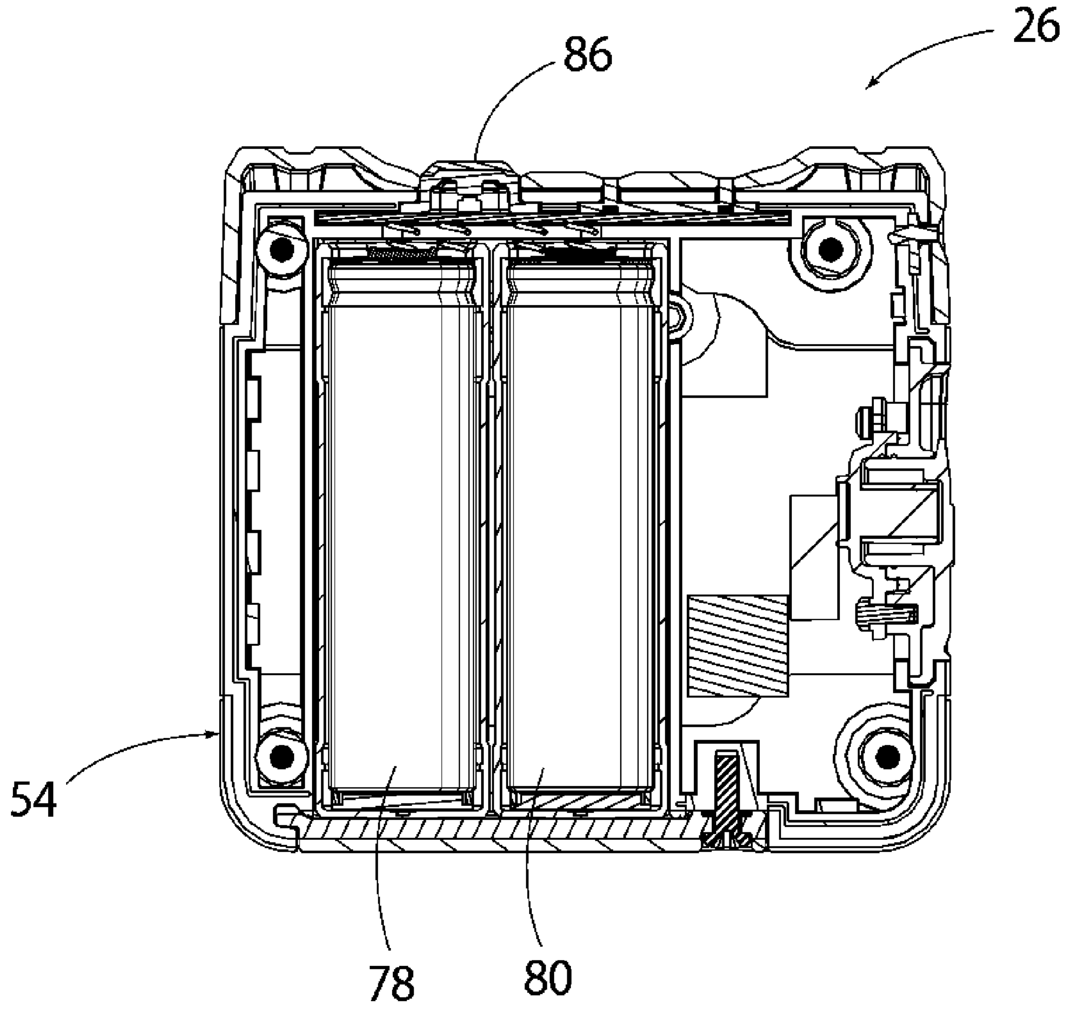
FIG. 10C is a cross-sectional view of the energy storage system of the lighting system, in accordance with one embodiment of the present invention.
Figure 10D:
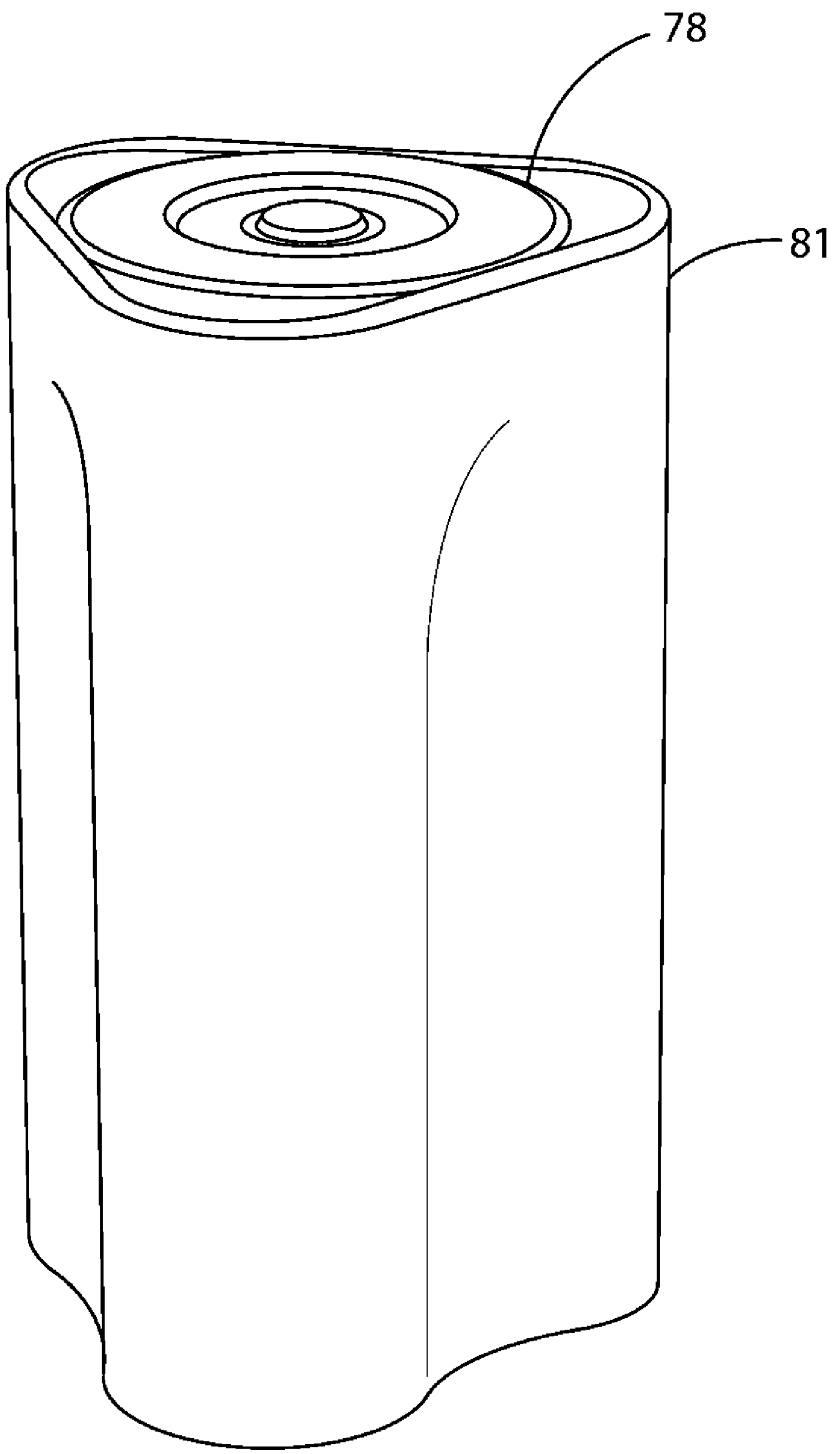
FIG. 10D is a perspective view of a trilobe cartridge housing a battery cell, in accordance with one embodiment of the present invention.
Figure 11A:
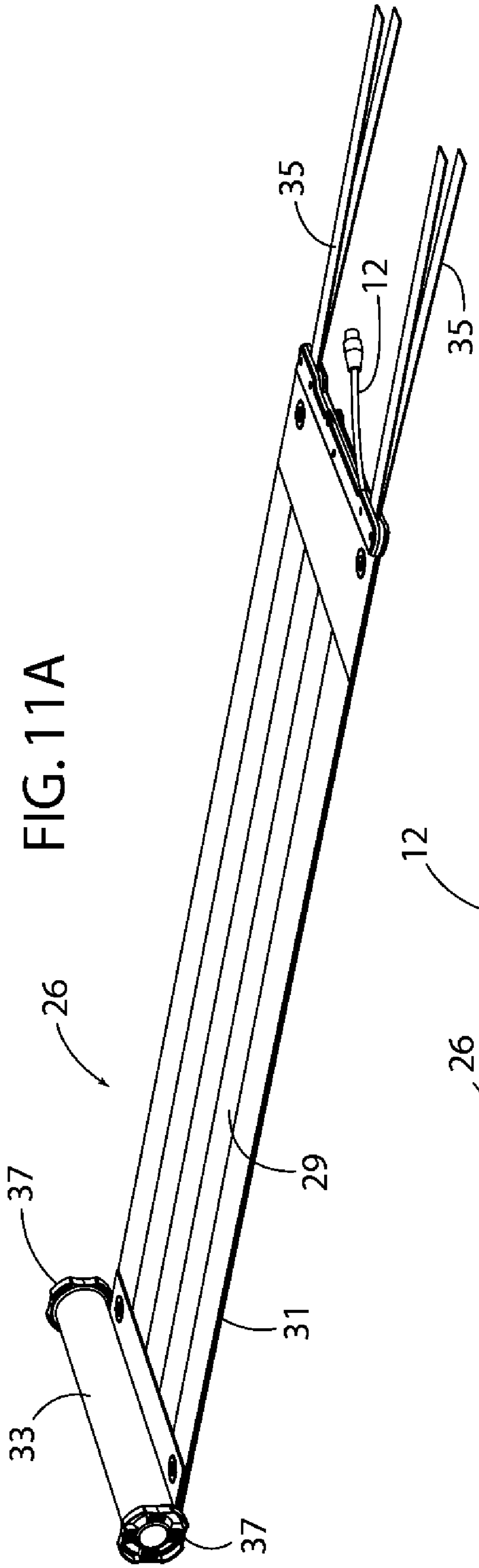
FIG. 11A is a top perspective view of a solar power source of a lighting system in a solar radiation harvesting position, in accordance with one embodiment of the present invention.
Figure 11C:
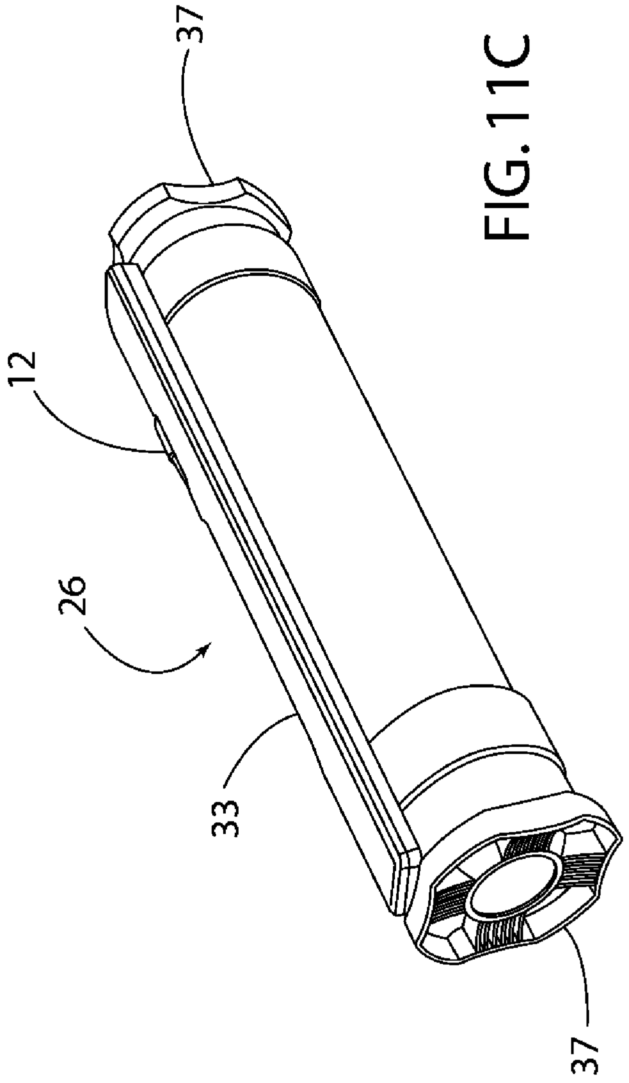
FIG. 11C is a front perspective view of the solar power source of the lighting system in a rolled-up position, in accordance with one embodiment of the present invention.
Figure 11B:
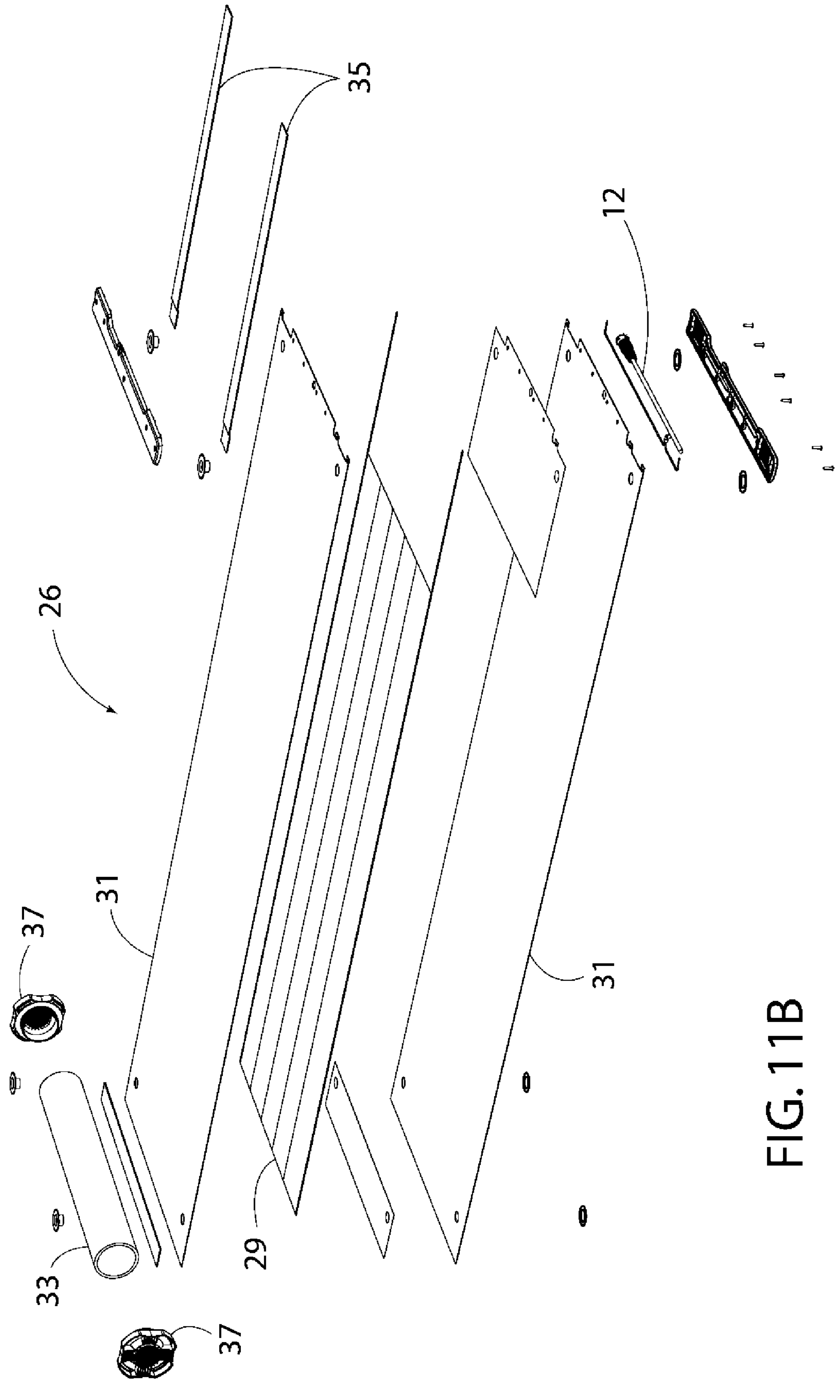
FIG. 11B is an exploded view of the solar power source of the lighting system in a solar radiation harvesting position, in accordance with one embodiment of the present invention.

With respect to FIG. 10D, the battery cells 78,80 can be housed in a trilobe cartridge 81. The energy storage system 24 can be configured to receive the trilobe cartridge 81. Typically, there are three (3) battery cells serially electrically connected, which are housed in the trilobe cartridge 81.

While the invention has been described in detail herein in accordance with certain preferred embodiments thereof, many modifications and changes therein may be affected by those skilled in the art without departing from the spirit of the invention. Accordingly, it is our intent to be limited only by the scope of the appending claims and not by way of the details and instrumentalities describing the embodiments shown herein.

What is claimed is:

1. An energy storage system comprising:

a plurality of battery cells configured to be electrically connected to a power source, said plurality of battery cells comprising:

a first battery cell; and a second battery cell; and a controller in communication with said first and second battery cells, said controller controls an electrical current supplied to said first and second battery cells, such that a first charging method is utilized when a voltage potential of said first and second battery cells is less than a first voltage potential threshold, respectively, and a second charging method is utilized when said voltage potential of said first and second battery cells is equal to or greater than said first voltage potential threshold, wherein said first charging method charges at least one of said first and second battery cells at a greater rate than said second charging method, and said first charging method is utilized to charge said first battery cell prior to being utilized to charge said second battery cell when said voltage potential of said first battery cell is below said first voltage potential threshold and greater than said voltage potential of said second battery cell, and wherein the second charging method charges one of the first and second battery cells having the lowest voltage potential equal to or greater than the first voltage potential threshold prior to charging the other of the first and second battery cells.

2. The energy storage system of claim 1, wherein a substantially constant electrical current is supplied to said first battery cell prior to providing said electrical current to said second battery cell when said voltage potential of said first battery cell is greater than said voltage potential of said second battery cell.

3. The energy storage system of claim 1, wherein said first charging method comprises supplying a substantially constant electrical current, and said second charging method comprises supplying an electrical current at a substantially constant voltage potential.

4. The energy storage system of claim 1, wherein at least a portion of said plurality of battery cells are at least one comprising:

a lithium battery cell;

a lithium-ion (Li-Ion) battery cell; and a nickel metal hydride (NiMH) battery cell.

5. The energy storage system of claim 1, wherein an electrical current supplied to at least a portion of said plurality of battery cells has a voltage potential of approximately eight volts (8V) to twelve volts (12V).

6. The energy storage system of claim 1, wherein said controller tapers off an electrical current supplied to said first battery cell when utilizing the second charging method.

7. The energy storage system of claim 1, wherein said controllers controls an electrical current supplied to said plurality of battery cells based upon a monitored temperature of at least one of said plurality of battery cells.

8. The energy storage system of claim 1, wherein said first charging method comprises said controller controlling a supply of an electrical current to said first and second battery cells, such that a substantially constant electrical current is supplied to said first battery cell for a period of time when said voltage potential of said first battery cell is below said first voltage potential threshold, and then controlling said substantially constant electrical current being supplied to said second battery cell when said voltage potential of said second battery cell is below said first voltage potential threshold.

9. The energy storage system of claim 1, wherein said second charging method comprises said controller controlling a supply of an electrical current to said first and second battery cells, such that said electrical current at a substantially constant voltage potential is supplied to said first battery when substantially all of said plurality of battery cells have a voltage potential of at least one of equal to or greater than said first voltage potential threshold.

10. The energy storage system of claim 1, wherein said plurality of battery cells are electrically connected in series in a trilobe cartridge.

11. The energy storage system of claim 1, wherein the energy storage system charges first and second battery cells of a flashlight system.

12. An energy storage system comprising:

a plurality of battery cells configured to be electrically connected to a power source, said plurality of battery cells comprising:

a first battery cell; and a second battery cell; and a controller in communication with said first and second battery cells, said controller controls an electrical current supplied to said first and second battery cells, such that a substantially constant electrical current is supplied to said first and second battery cells for a period of time when a voltage potential of said first and second battery cells is less than a first voltage potential threshold, respectively, and controlling an electrical current at a substantially constant voltage potential that is supplied to said first and second battery cells when said voltage potential of said first and second battery cells is equal to or greater than said first voltage potential threshold, said substantially constant electrical current is supplied to said first battery cell prior to providing an electrical current to said second battery cell, wherein said voltage potential of said first battery cell is below said first voltage potential threshold, and said voltage potential of said first battery cell is greater than said voltage potential of said second battery cell, and wherein the electrical current at a substantially constant voltage potential is supplied to one of the first and second battery cells having the lowest voltage potential equal to or greater than the first voltage potential threshold prior to charging the other of the first and second battery cells.

13. The energy storage system of claim 12, wherein said electrical current supplied to at least a portion of said plurality of battery cells has a voltage potential of approximately eight volts (8V) to twelve volts (12V).

14. The energy storage system of claim 12, wherein said controllers controls said electrical current supplied to said plurality of battery cells based upon a monitored temperature of at least one of said plurality of battery cells.

15. The energy storage system of claim 12, wherein said plurality of battery cells are electrically connected in series in a trilobe cartridge.

16. A method of charging a plurality of battery cells in an energy storage system, said method comprising the steps of:

charging one of a first battery cell and a second battery cell utilizing a first charging method when at least one of said first and second battery cells have a voltage potential less than a first voltage potential threshold;

charging one of said first battery cell and second battery cell utilizing a second charging method when said first and second battery cells have a voltage potential equal to or greater than said first voltage potential threshold, wherein said first charging method charges said first and second battery cells at a quicker rate than said second charging method;

charging one of said first and second battery cells having the greatest voltage potential that is below the first voltage potential utilizing said first charging method prior to charging the other of said first and second battery cells; and wherein the second charging method charges one of the first and second battery cells having the lowest voltage potential equal to or greater than the first voltage potential threshold prior to charging the other of the first and second battery cells.

17. The method of claim 16 further comprising the step of supplying said electrical current to said first battery cell based upon a monitored temperature of at least said first battery cell.

18. The method of claim 16 further comprising the step of utilizing said first charging method to supply a substantially constant electrical current to said first battery cell for a period of time when said voltage potential is below said first voltage potential threshold, and then utilizing said first charging method to supply said substantially constant electrical current to said second battery cell when said voltage potential of said second battery cell is below said first voltage potential threshold.

19. The method of claim 16 further comprising the step of supplying said electrical current at said substantially constant voltage potential to said first battery when substantially all of a plurality of battery cells that have a voltage potential of at least one of equal to and greater than said first voltage potential threshold.

20. The method of claim 16, wherein said electrical current is supplied at a voltage potential of approximately eight volts (8V) to twelve volts (12V).

21. The method of claim 16, wherein at least a portion of the plurality of battery cells are at least one comprising:

a lithium battery cell;

a lithium-ion (Li-Ion) battery cell; and a nickel metal hydride (NiMH) battery cell.

22. The method of claim 16, wherein said first charging method comprises supplying a substantially constant electrical current, and said second charging method comprises supplying an electrical current at a substantially constant voltage potential.

23. A method of charging a plurality of battery cells in an energy storage system, said method comprising the steps of:

charging one of a first battery cell and a second battery cell by supplying a substantially constant electrical current when at least one of said first and second battery cells have a voltage potential less than a first voltage potential threshold;

charging one of said first and second battery cells by supplying an electrical current at a substantially constant voltage potential when said first and second battery cells have a voltage potential equal to or greater than said first voltage potential threshold;

charging one of said first and second battery cells having the greatest voltage potential that is below the first voltage potential by supplying said substantially constant electrical current prior to charging the other of said first and second battery cells; and wherein the electrical current supplied at a substantially constant voltage potential is supplied to one of the first and second battery cells having the lowest voltage potential equal to or greater than the first voltage potential threshold prior to charging the other of the first and second battery cells.

24. The method of claim 23 further comprising the step of supplying said electrical current to said first battery cell based upon a monitored temperature of at least said first battery cell.

25. The method of claim 23 further comprising the step of supplying said substantially constant electrical current to said first battery cell for a period of time when said voltage potential is below said voltage potential threshold, and then supplying said substantially constant electrical current to said second battery cell when said voltage potential of said second battery cell is below said first voltage potential threshold.

26. The method of claim 23 further comprising the step of supplying said electrical current at said substantially constant voltage potential to said first battery when substantially all of a plurality of battery cells that have a voltage potential of at least one of equal to and greater than said first voltage potential threshold.

27. The method of claim 23, wherein said electrical current is supplied at a voltage potential of approximately eight volts (8V) to twelve volts (12V).

28. The method of claim 23, wherein at least a portion of the plurality of battery cells are at least one comprising:

a lithium battery cell;

a lithium-ion (Li-Ion) battery cell; and a nickel metal hydride (NiMH) battery cell.

* * * * *